United States Patent
Matus et al.

(10) Patent No.: US 12,487,498 B2
(45) Date of Patent: Dec. 2, 2025

(54) WATER-RESISTANT SEALING LAYER FOR SEALING MICROCELLS OF ELECTRO-OPTIC DEVICES

(71) Applicant: E INK CORPORATION, Billerica, MA (US)

(72) Inventors: Yuriy Borisovich Matus, Pleasanton, CA (US); Chandra Bikram Kc, San Jose, CA (US); Saemi Oh Poelma, Sunnyvale, CA (US); Haiyan Gu, Fremont, CA (US); Donald A. Schultz, San Jose, CA (US); Abraham Berhane, Tracy, CA (US)

(73) Assignee: E INK CORPORATION, Billerica, MA (US)

( * ) Notice: Subject to any disclaimer, the term of this patent is extended or adjusted under 35 U.S.C. 154(b) by 372 days.

(21) Appl. No.: 18/296,625

(22) Filed: Apr. 6, 2023

(65) Prior Publication Data
US 2023/0324761 A1   Oct. 12, 2023

Related U.S. Application Data

(60) Provisional application No. 63/329,066, filed on Apr. 8, 2022.

(51) Int. Cl.
| | |
|---|---|
| *G02F 1/16766* | (2019.01) |
| *B42D 25/21* | (2014.01) |
| *B42D 25/36* | (2014.01) |
| *G02F 1/1333* | (2006.01) |

(Continued)

(52) U.S. Cl.
CPC .......... *G02F 1/1679* (2019.01); *B42D 25/21* (2014.10); *B42D 25/36* (2014.10); *G02F 1/133394* (2021.01); *G02F 1/167* (2013.01); *G02F 1/16766* (2019.01)

(58) Field of Classification Search
CPC .. G02F 1/167; G02F 1/1681; G02F 1/133377; G02F 1/133394; G02F 1/1339; G02F 1/1679; C08L 75/04; C08L 29/04; C09D 129/04; C09D 5/00
See application file for complete search history.

(56) References Cited

U.S. PATENT DOCUMENTS

| | | | |
|---|---|---|---|
| 6,241,921 B1 | 6/2001 | Jacobson et al. | |
| 6,922,276 B2 | 7/2005 | Zhang et al. | |
| 6,933,098 B2 | 8/2005 | Chan-Park et al. | |

(Continued)

FOREIGN PATENT DOCUMENTS

| | | |
|---|---|---|
| TW | 201412553 A | 4/2014 |

OTHER PUBLICATIONS

European Patent Office, "International Search Report and Written Opinion", PCT/US2023/065454, Jul. 31, 2023. Jul. 31, 2023.

(Continued)

*Primary Examiner* — Brandi N Thomas
(74) *Attorney, Agent, or Firm* — Ioannis Constantinides

(57) ABSTRACT

The present invention is directed to a sealing layer that comprises a combination of polyurethane and poly(vinyl alcohol), the poly(vinyl alcohol) containing an acetoacetate functional group in its molecular structure. The sealing layer is formed from an aqueous sealing composition and shows water resistance and good barrier properties to non-polar fluids. The sealing layer can be used to seal microcells of electro-optic displays.

21 Claims, 12 Drawing Sheets

(51) Int. Cl.
*G02F 1/167* (2019.01)
*G02F 1/1679* (2019.01)

(56) References Cited

U.S. PATENT DOCUMENTS

| | | | |
|---|---|---|---|
| 6,982,178 B2 | 1/2006 | LeCain et al. | |
| 7,002,728 B2 | 2/2006 | Pullen et al. | |
| 7,005,468 B2 | 2/2006 | Zang et al. | |
| 7,012,600 B2 | 3/2006 | Zehner et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,312,784 B2 | 12/2007 | Baucom et al. | |
| 7,411,719 B2 | 8/2008 | Paolini, Jr. et al. | |
| 7,453,445 B2 | 11/2008 | Amundson | |
| 7,535,624 B2 | 5/2009 | Amundson et al. | |
| 7,561,324 B2 | 7/2009 | Duthaler et al. | |
| 7,615,325 B2 | 11/2009 | Liang et al. | |
| 7,679,814 B2 | 3/2010 | Paolini, Jr. et al. | |
| 7,715,088 B2 | 5/2010 | Liang et al. | |
| 7,839,564 B2 | 11/2010 | Whitesides et al. | |
| 8,009,348 B2 | 8/2011 | Zehner et al. | |
| 9,279,906 B2 | 3/2016 | Kang | |
| 10,444,553 B2 | 10/2019 | Laxton | |
| 11,176,391 B1* | 11/2021 | Pallerla | G06V 40/14 |
| 2004/0120024 A1 | 6/2004 | Chen et al. | |
| 2004/0219306 A1 | 11/2004 | Wang et al. | |
| 2014/0017418 A1* | 1/2014 | Shim | G02F 1/133528 428/1.31 |
| 2015/0005702 A1* | 1/2015 | Soper | A61J 7/0046 604/78 |
| 2015/0005720 A1 | 1/2015 | Zang et al. | |
| 2016/0012710 A1 | 1/2016 | Lu et al. | |
| 2017/0025072 A1* | 1/2017 | Lin | G09G 3/2003 |
| 2020/0056051 A1 | 2/2020 | Saito | |
| 2022/0244612 A1 | 8/2022 | Sarvi et al. | |
| 2022/0251364 A1 | 8/2022 | Sarvi et al. | |

OTHER PUBLICATIONS

Harvey, T.G.; "Replication techniques for micro-optics"; SPIE Proc. vol. 3099, pp. 76-82; 1997. Jan. 1, 1997.

* cited by examiner

WATER-RESISTANT SEALING LAYER FOR SEALING MICROCELLS OF ELECTRO-OPTIC DEVICES

CROSS-REFERENCE TO RELATED APPLICATIONS

This application claims priority to U.S. Provisional Patent Application No. 63/329,066, filed on Apr. 8, 2022, which is incorporated by reference in its entirety, along with all other patents and patent applications disclosed herein.

FIELD OF THE INVENTION

This invention relates to a sealing layer for sealing microcells of electro-optic devices. The sealing layer comprises a combination of polyurethane and poly(vinyl alcohol), the poly(vinyl alcohol) containing an acetoacetate functional group in its molecular structure. The sealing layer is water-resistant and shows good barrier properties to non-polar fluids.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic devices. This type of display is properly called "multi-stable" rather than bistable, although for convenience the term "bistable" may be used herein to cover both bistable and multi-stable displays.

One type of electro-optic device, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications, which are assigned to or in the names of the Massachusetts Institute of Technology (MIT), E Ink Corporation, E Ink California, LLC and related companies, describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film.

The technologies described in these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; 7,005.468; and 7,715,088; and U.S. Patent Application Publications Nos. 2004-0120024; 2004-0219306; 2022-0244612; and 2022-0251364;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348; and (j) Non-electrophoretic displays, as described in U.S. Pat. No. 6,241,921; and U.S. Patent Applications Publication No. 2015/0277160; and applications of encapsulation and microcell technology other than displays; see for example U.S. Pat. No. 7,615,325; and U.S. Patent Application Publications Nos. 2015/0005720 and 2016/0012710.

The contents of all of the above references are incorporated herein by reference in their entirety.

Structures having a plurality of sealed microcells containing a dispersion of charged pigment particles in a non-polar fluid are used commercially in electro-optic devices. The microcells are also known in the literature as microcavities or microcups. A typical process of making sealed microcell structures for electro-optic devices involves (a) fabricating, via microembossing, a polymeric sheet having a plurality of microcavities, wherein each microcavity has an opening, (b) filling the microcavities with an electrophoretic medium, which is a dispersion comprising charged pigment particles in a non-polar fluid, and (c) sealing the microcavities with a sealing composition, forming a sealing layer. The sealed microcavities, which contain electrophoretic medium, form the electro-optic material layer of the device. The electro-optic material layer is disposed between a front and a rear electrode. Application of an electric field across the electro-phoretic medium via these electrodes causes pigment particles to migrate through the electrophoretic medium creating an image. The sealing layer plays an important role for the function and performance of the device.

Firstly, because the sealing layer is in contact with the electrophoretic medium and seals it inside the microcavities, (1) it must be practically insoluble in the non-polar fluid of the electrophoretic medium, and (2) it must be a good barrier to the non-polar fluid, so that the non-polar fluid does not diffuse out form the microcells during the life of the device. Inferior barrier properties of the sealing layer towards the non-polar fluids lead to the reduction of the fluid from the electrophoretic medium and sagging of the sealing layer.

Secondly, in certain applications, where the electrophoretic device may be exposed to harsh conditions, such as exposure to water or even insertion in water, the sealing layer needs to be water-resistant. That is, the sealing layer must be resilient in water and must protect the electrophoretic medium under such conditions.

The technical problem of providing sealing compositions that form sealing layers with all these features is difficult, because the different objectives may require different formulation strategies. For example, barrier property for non-polar fluids typically require more hydrophilic components of the sealing layer, whereas such components are more sensitive to water. Thus, there is a need for sealing compositions that form optimized sealing layers for improved barrier towards non-polar fluids and improved water resistance. The inventors of the present invention found that sealing layers that are formed by aqueous sealing compositions comprising a combination of polyurethane and poly (vinyl alcohol), the poly(vinyl alcohol) containing an acetoacetate functional group in its molecular structure, have good water-resistance and good barrier properties for non-polar fluids, and good electro-optic performance.

SUMMARY OF THE INVENTION

In one aspect, the present invention is directed to a sealing layer comprising (i) from 40 to 95 weight percent of a poly(vinyl alcohol) by weight of the sealing layer excluding solvents, the poly(vinyl alcohol) containing an acetoacetate functional group in its molecular structure; and (ii) from 5 to 60 weight percent of a polyurethane by weight of the sealing layer excluding solvents. The polyurethane of the sealing layer may have Peak Melting Temperature of 115° C. and higher and Index of Crystallinity of 8% and higher. The polyurethane of the sealing layer may be an ester polyurethane, an ether polyurethane, or a polycarbonate polyurethane. The polyurethane may have number average molecular weight from 1,000 to 2,000,000 Daltons. The polyurethane of the sealing layer may be crosslinked. The polyurethane crosslinker may be a polyisocyanate, a multifunctional polycarbodiimide, a multifunctional aziridine, a silane coupling agent, a boron/titanium/zirconium-based crosslinker, or a melamine formaldehyde. The poly(vinyl alcohol) of the sealing layer may be crosslinked. The poly (vinyl alcohol) of the sealing layer may have number average molecular weight from 1,000 to 1,000,000 Daltons. The poly(vinyl alcohol) may have a degree of hydrolysis of from 90 to 99 percent. The poly(vinyl alcohol) may be crosslinked. The crosslinked poly(vinyl alcohol) may be formed by the reaction of poly(vinyl alcohol) and a crosslinker, the crosslinker being selected from the group consisting of dialdehyde, and organic zirconate. The crosslinker of the poly(vinyl alcohol) may be selected from the group consisting of glyoxal, $ZrO(OH)Cl*nH_2O$, and $(NH_4)_2ZrO(CO_3)_2$. Both the polyurethane and the poly(vinyl alcohol) of the sealing layer may be crosslinked. The poly(vinyl alcohol) of the sealing layer may be non-crosslinked. The sealing layer may comprise a surfactant. The surfactant of the sealing layer may be an acetylenic diol or an organosilicone surface tension reducing agent.

The sealing layer may be formed by an aqueous sealing composition. The aqueous sealing composition may comprising from 40 to 95 weight percent of a poly(vinyl alcohol) by weight of the aqueous sealing composition excluding solvents, the poly(vinyl alcohol) containing an acetoacetate functional group in its molecular structure; and (ii) from 5 to 60 weight percent of a polyurethane by weight of the aqueous sealing composition excluding solvents, and (iii) an aqueous carrier. The polyurethane of the aqueous sealing composition may be an ester polyurethane, an ether polyurethane, or a carbonate polyurethane. The polyurethane of the aqueous sealing composition may have Peak Melting Temperature of 115° C. and higher and Index of Crystallinity of 8% and higher. The polyurethane may have number average molecular weight from 1,000 to 2,000,000 Daltons. The aqueous sealing composition may further comprise a polyurethane crosslinker. The polyurethane crosslinker may be a polyisocyanate, a multifunctional polycarbodiimide, a multifunctional aziridine, a silane coupling agent, a boron/titanium/zirconium-based crosslinker, or a melamine formaldehyde. The aqueous sealing composition may free of a poly(vinyl alcohol) crosslinker. The aqueous sealing composition may comprise a poly(vinyl alcohol) crosslinker. The aqueous sealing composition that comprises the poly (vinyl alcohol) crosslinker may have a pot life longer than 1 day, longer than 3 days, longer than 5 days, or longer than 7 days. The poly(vinyl alcohol) of the aqueous sealing composition may have number average molecular weight from 1,000 to 1,000,000 Daltons. The poly(vinyl alcohol) may have a degree of hydrolysis of from 90 to 99 percent. The aqueous sealing composition may comprise both a polyurethane crosslinker and a poly(vinyl alcohol) crosslinker. The sealing layer may comprise a surfactant. The surfactant of the sealing layer may be an acetylenic diol or an organosilicone surface tension reducing agent. The aqueous sealing composition may comprise a polymeric rheology modifier. The polymeric rheology modifier may be a hydrophobically-modified alkali swellable acrylic emulsion.

The sealing layer may be used for sealing microcells of an electrophoretic display The electrophoretic display may comprise in order a first light-transmissive electrode layer, an electro-optic material layer, and a second electrode layer. The electro-optic material layer comprising a sealing layer and a microcell layer. The microcell layer comprises a plurality of microcells, each of the plurality of microcells including a bottom, walls, and an opening, and containing an electrophoretic medium. The electrophoretic medium comprises at least one type of charged pigment particles dispersed in a non-polar fluid. The electrophoretic fluid may comprise two or more types of charged pigment particles. The electrophoretic medium may comprise four types of charged pigment particles, wherein the color of the four or more pigment particles are selected from the group consisting of white, magenta, yellow, cyan, blue, red, green, and black. The sealing layer spans the openings of the plurality of microcells. The sealing layer may be disposed between the microcell layer and the second electrode layer. The sealing layer may be disposed between the microcell layer and the first light-transmissive electrode layer. The a sealing layer comprises (i) from 40 to 95 weight percent of a poly(vinyl alcohol) by weight of the sealing layer excluding solvents, the poly(vinyl alcohol) containing an acetoacetate functional group in its molecular structure; and (ii) from 5 to 60 weight percent of a polyurethane by weight of the sealing layer excluding solvents. The electrophoretic display may further comprise a piezoelectric material layer, wherein stress on the layer of piezoelectric material results in optical changes in the electro-optic material layer. The piezoelectric material layer may be positioned (a) between the electro-optic material layer and the first light-transmissive electrode layer, or (b) between the electro-optic material layer and the second electrode layer.

The sealing layer may also be used for sealing microcells of a front plane laminate. The front plane laminate may comprise a first light-transmissive electrode layer, an electro-optic material layer, an adhesive layer, and a release sheet. The electro-optic material layer is disposed between the first light-transmissive electrode layer and the second electrode layer. The electro-optic material layer comprises a plurality of microcells and a sealing layer.

The sealing layer may also be used for sealing microcells of a front plane laminate. The front plane laminate may comprise a first light-transmissive electrode layer, an electro-optic material layer, an adhesive layer, and a release sheet. The electro-optic material layer is disposed between the first light-transmissive electrode layer and the second electrode layer. The electro-optic material layer comprises a plurality of microcells and a sealing layer. The sealing layer may be formed by an aqueous sealing composition. Each of the plurality of microcell includes a bottom, walls, and an opening, and contains an electrophoretic medium, wherein said electrophoretic medium comprises at least one type of charged pigment particles dispersed in a non-polar fluid. The sealing layer spans the openings of the plurality of microcells. The front plane laminate may further comprise a piezoelectric material layer, wherein stress on the layer of piezoelectric material results in optical changes in the electro-optic material layer. The piezoelectric material layer may be positioned (a) between the electro-optic material layer and the first light-transmissive electrode layer, (b) between the electro-optic material layer and the adhesive layer, or (c) side-by-side next to the electro-optic material layer.

The sealing layer may also be used for sealing microcells of a double release sheet. The double release sheet may comprise a first release sheet, a first adhesive layer, an electro-optic material layer, a second adhesive layer, and a second release sheet. The electro-optic material layer may comprise a plurality of microcells and a sealing layer. The sealing layer may be formed from an aqueous sealing composition. Each of the plurality of microcell includes a bottom, walls, and an opening, and contains an electrophoretic medium, wherein said electrophoretic medium comprises at least one type of charged pigment particles dispersed in a non-polar fluid. The sealing layer spans the openings of the plurality of microcells.

BRIEF DESCRIPTION OF DRAWINGS

In FIGS. 6C and 6D a combination of top and bottom exposure is used, allowing the walls in one lateral direction to be cured by top photomask exposure, and the walls in another lateral direction to be cured bottom exposure through the opaque base conductor film.

DETAILED DESCRIPTION OF THE INVENTION

Figure 1:
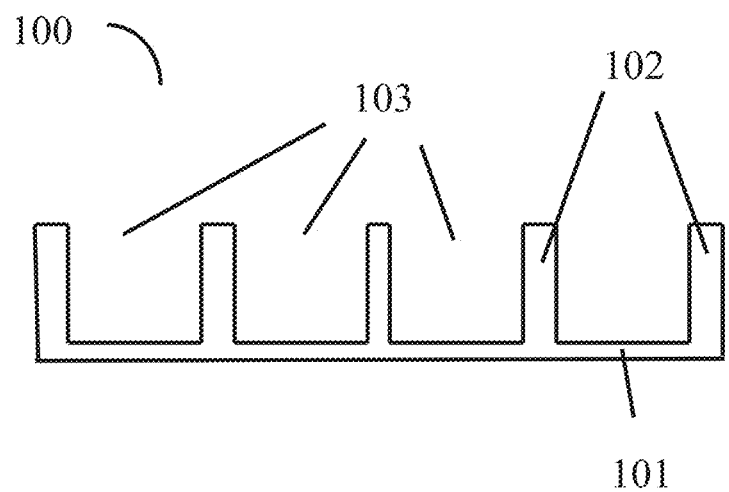
FIG. 1 illustrates a structure of a plurality of microcells before they are filled and sealed.

The term "excluding solvents", referring to the weight of the sealing layer of the present invention, means that the referred weight of the sealing layer does not include water and other solvents that may be present in the sealing layer.

The term "molecular weight" or "MW" as used herein refers to the number average molecular weight, unless otherwise stated. The number average molecular weight may be measured by gel permeation chromatography.

The terms "crosslinking agent" and "crosslinker" are synonymous and refer to a reagent that can react with a crosslinkable polymer to form a crosslinked polymer.

The term "pot life" of a composition is the amount of time that the composition remains in a workable liquid form at a specific temperature.

The degree of hydrolysis of homopolymers and copolymers of polyvinyl alcohols is routinely reported by manufactures of such polymer and it indicates the proportion by units (moles) of vinyl alcohol in the polymer to the total vinyl units. The other units include vinyl acetate (ester) or other units.

"Water resistant sealing layer" is related to the integrity of the sealing layer of an electro-optic display after the submersion of the device in water of a specific pH and temperature and for a specific time period.

The term "light-transmissive" is used herein to mean that the layer thus designated transmits sufficient light to enable an observer, looking through that layer, to observe the change in display states of the electrophoretic medium, which will normally be viewed through the light-transmissive electrode layer and adjacent substrate, if present; in cases where the electrophoretic medium displays a change in reflectivity at non-visible wavelengths, the term "light-transmissive" should of course be interpreted to refer to transmission of the relevant non-visible wavelengths.

The term "contrast ratio" (CR) for an electro-optic display is defined as the ratio of the luminance of the brightest color (white) to that of the darkest color (black) that the display is capable of producing. Normally a high contrast ratio, or CR, is a desired aspect of a display.

Piezoelectricity is the charge that accumulates in a solid material in response to applied mechanical stress. Suitable piezoelectric materials may include polyvinylidene fluoride (PVDF), quartz ($SiO_2$), berlinite ($AlPO_4$), gallium orthophosphate ($GaPO_4$), tourmaline, barium titanate ($BaTiO_3$), lead zirconate titanate (PZT), zinc oxide (ZnO), aluminum nitride (AlN), lithium tantalite, lanthanum gallium silicate, potassium sodium tartrate and any other known piezo materials. Piezoelectricity may be utilized to drive the pigments of an electrophoretic material of an electro-optic display to generate a charge for powering an electro-optic display. The electro-optic display can operate without a power source, powered solely by charges generated by the piezoelectric material. For example, in the case of electro-optic displays having electrophoretic material, voltage may be generated by bending or introducing stress to piezo material, and this voltage can be utilized to cause movement of the color pigments of the electrophoretic material of an electro-optic display. Electro-optic displays comprising electrophoretic media and piezoelectric materials have been previously disclosed, for example, in U.S. Pat. Nos. 7,002,728, and 7,679,814.

A. Structure of Microcells

FIG. 1 illustrates a structure of a plurality of microcells 100 before they are filled and sealed. Each microcell comprises bottom 101, walls 102, and opening 103.

B. Structure of Electro-optic Devices Comprising Microcell Structures

Figure 2:
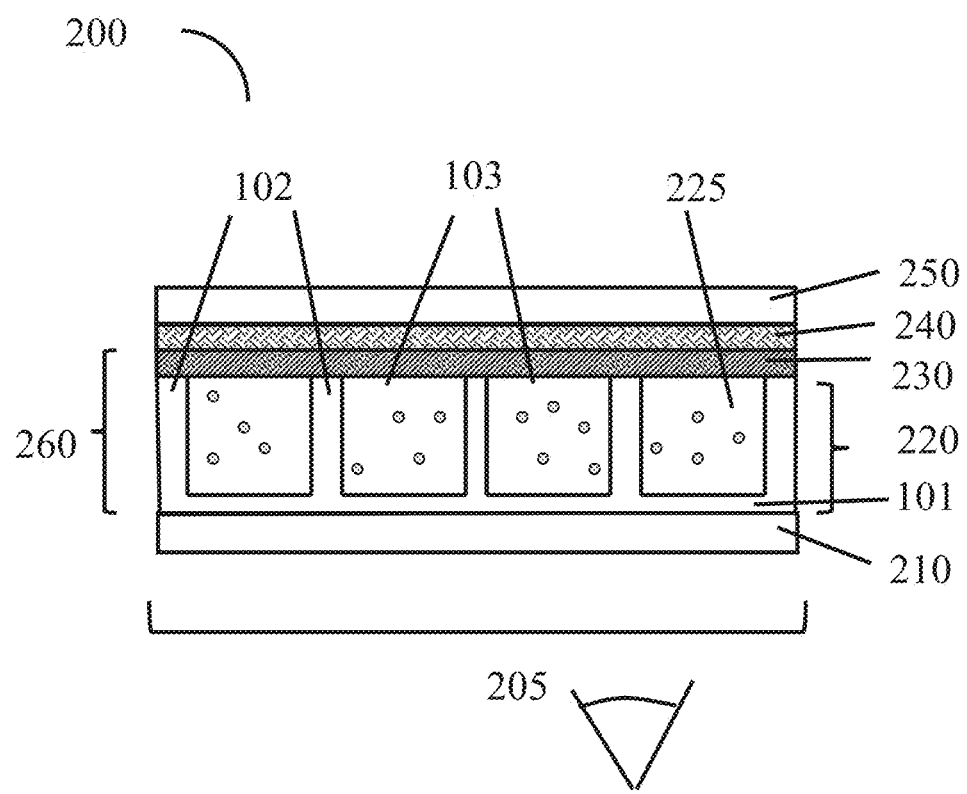
FIG. 2 illustrates an example of an electro-optic device comprising a microcell structure.

FIG. 2 illustrates an example of electro-optic device 200 comprising a plurality of microcells and a sealing layer according to the present invention. This example of electro-optic device 200 comprises first light-transmissive electrode layer 210, microcell layer 220, sealing layer 230, adhesive layer 240, and second electrode layer 250. Microcell layer 220 comprises a plurality of microcells that are defined by bottom 101 and walls 102. Each of the plurality of microcells has an opening 103. Each of the plurality of microcells contains electrophoretic medium 225, which comprises charged particles in a non-polar fluid. The microcells are sealed with sealing layer 230, which spans the openings 103 of the plurality of the microcells. Second electrode layer 250 is connected to sealing layer 230 with adhesive layer 240. Electro-optic material layer 260 of electro-optic device 200 comprises microcell layer 220 and sealing layer 230. A source of an electric field (not shown in FIG. 2) may connect first light-transmissive electrode layer 210 with second electrode layer 250. Application of an electric field across the electrophoretic material layer causes the charge particles to migrate through the electrophoretic medium, creating an image that can be observed by an observer looking from viewing side 205 of electro-optic device 200. An optional primer layer (not shown in FIG. 2) may be disposed between first light-transmissive electrode layer 210 and the plurality of microcells. The sealing layer is water-resistant and comprises from 40 to 95 weight percent of a poly(vinyl alcohol) by weight of the sealing layer excluding solvents, the poly(vinyl alcohol) containing an acetoacetate functional group in its molecular structure; and from 5 to 60 weight percent of a polyurethane by weight of the sealing layer excluding solvents.

Figure 3:
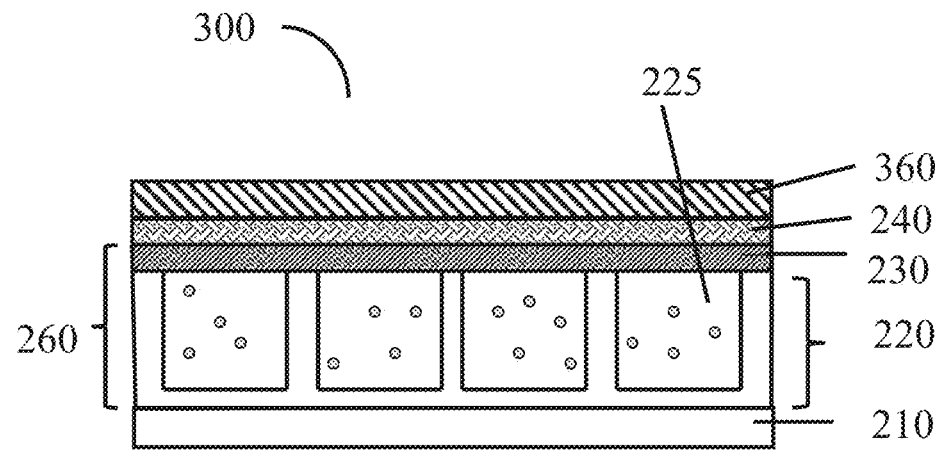
FIG. 3 illustrates an example of a front plane laminate assembly that can be used to form an electro-optic device comprising a microcell structure.

The example of an electro-optic device illustrated in FIG. 2 may be constructed by front plane laminate 300, which is shown in FIG. 3. Front plane laminate 300 comprises first light-transmissive electrode layer 210, a microcells layer 220 having a plurality of microcells, sealing layer 230, adhesive layer 240, and release sheet 360. Each of the plurality of microcells contains electrophoretic medium 225, which comprises charged particles in a non-polar fluid. The microcells are sealed with sealing layer 230, which spans the openings of the plurality of the microcells. Release sheet 360 is connected to sealing layer 230 with adhesive layer 240. Electro-optical material layer 260 comprises microcell layer 220 and sealing layer 230. Removal of release sheet 360 exposes the surface of adhesive layer 240, which can be connected onto a second electrode layer to form an electro-optic device. An optional primer layer (not shown in FIG. 3) may be disposed between first light-transmissive electrode layer 210 and microcell layer 220.

Figure 4:
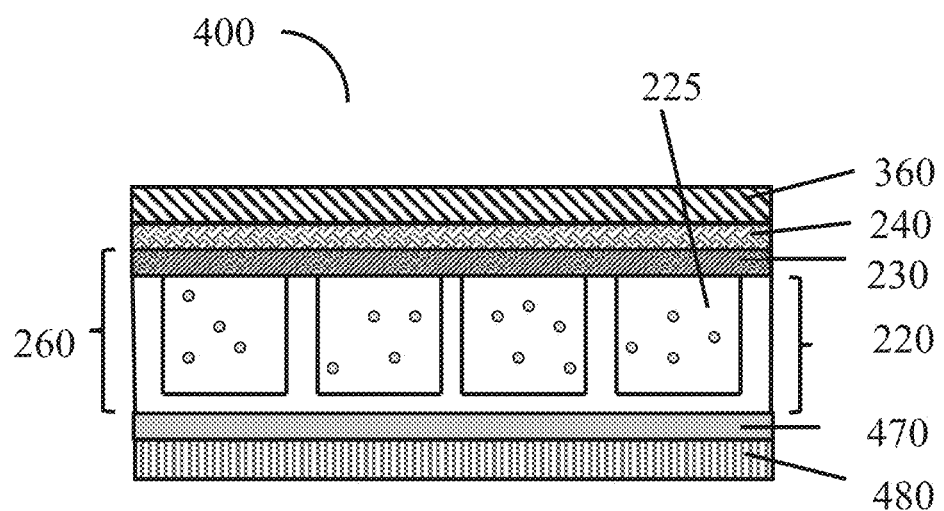
FIG. 4 illustrates an example of a double release sheet that can be used to form an electro-optic device comprising a microcell structure.

The example of an electro-optic device illustrated in FIG. 2 may be also constructed by double release sheet 400 that is shown in FIG. 4. Double release sheet 400 comprises first release sheet 480, first adhesive layer 470, microcell layer 220, sealing layer 230, second adhesive layer 240, and second release sheet 360. Each of the plurality of microcells contains electrophoretic medium 225, which comprises charged particles in a non-polar fluid. The microcells are sealed with sealing layer 230, which spans the openings of the plurality of the microcells. Electro-optical material layer 260 comprises microcell layer 220 and sealing layer 230. First release sheet 480 is connected to microcell layer 220 with first adhesive layer 470. Second release sheet 360 is connected to sealing layer 230 with second adhesive layer 240. Removal of first release sheet 480 exposes the surface of first adhesive layer 470, which can be connected onto a first light-transmissive electrode layer. Removal of second release sheet 360 exposes the surface of second adhesive layer 240, which can be connected onto a second electrode layer to form the electro-optic device. An optional primer layer (not shown in FIG. 4) may be disposed between first adhesive layer 470 and the microcell layer 220. The sealing layer of front plane laminate 300 of FIG. 3 and the sealing layer of double release sheet 400 of FIG. 400 are water-resistant. They comprise from 40 to 95 weight percent of a poly(vinyl alcohol) by weight of the sealing layer excluding solvents, the poly(vinyl alcohol) containing an acetoacetate functional group in its molecular structure; and from 5 to 60 weight percent of a polyurethane by weight of the sealing layer excluding solvents.

C. Formation of Microcell Structures

Figure 5:
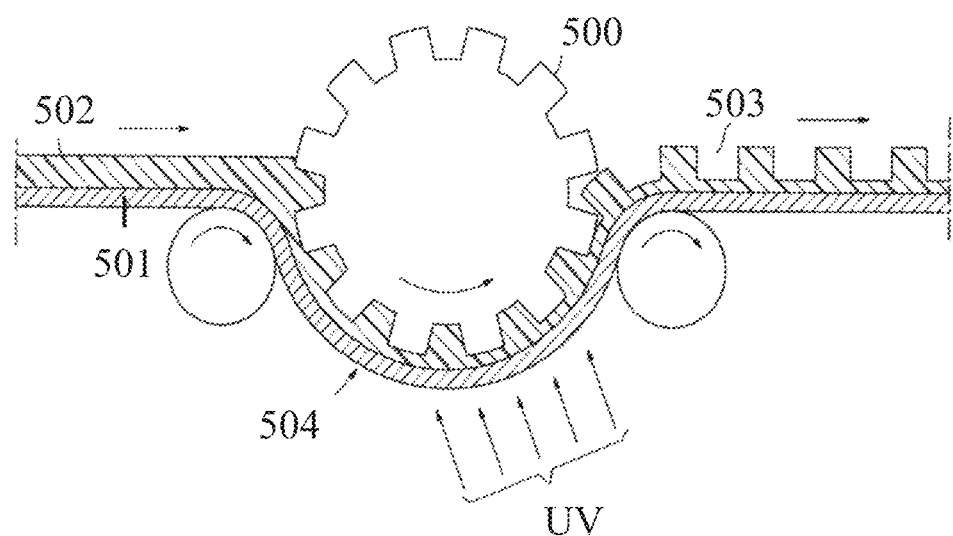
FIG. 5 shows a method for making microcells using a roll-to-roll process.

Techniques for constructing microcells. Microcells may be formed either in a batchwise process or in a continuous roll-to-roll process as disclosed in U.S. Pat. No. 6,933,098. The latter offers a continuous, low cost, high throughput manufacturing technology for production of compartments for use in a variety of applications including benefit agent delivery and electrophoretic displays. Microcell arrays suitable for use with the invention can be created with microembossing, as illustrated in FIG. 5. A male mold (500) may be placed either above web 504 or below web 504 (not shown); however, alternative arrangements are possible. For examples, please see U.S. Pat. No. 7,715,088, which is incorporated herein by reference in its entirety. A conductive substrate may be constructed by forming conductor film 501 on polymer substrate that becomes the backing layer for a device. A composition comprising a thermoplastic, thermoset, or a precursor thereof 502 is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastic or thermoset precursor for the preparation of the microcells may be multifunctional acrylate or methacrylate, vinyl ether, epoxide and oligomers or polymers thereof, and the like. A combination of multifunctional epoxide and multifunctional acrylate is also very useful to achieve desirable physico-mechanical properties. A cross-linkable oligomer imparting flexibility, such as urethane acrylate or polyester acrylate, may be added to improve the flexure resistance of the embossed microcells. The composition may contain polymer, oligomer, monomer and additives or only oligomer, monomer and additives. The glass transition temperatures (or $T_g$) for this class of materials usually range from about −70° C. to about 150° C., or from about −20° C. to about 50° C. The microembossing process is typically carried out at a temperature higher than the $T_g$. A heated male mold or a heated housing substrate against which the mold presses may be used to control the microembossing temperature and pressure.

As shown in FIG. 5, the mold is released during or after the precursor layer is hardened to reveal an array of microcells 503. The hardening of the precursor layer may be accomplished by cooling, solvent evaporation, crosslinking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer. A male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. The mold is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition. The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76-82 (1997). Alternatively, the mold can be made by photomachining using plastics, ceramics or metals.

Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring or the like, over the male mold. The dispenser may be moving or stationary. A conductor film is overlaid the UV curable resin. Pressure may be applied, if necessary, to ensure proper bonding between the resin and the plastic and to control the thickness of the floor of the microcells. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin, which should have a good release property against the mold surface.

Microcell arrays for the invention typically include a pre-formed conductor film, such as indium tin oxide (ITO) conductor lines; however, other conductive materials, such as silver or aluminum, may be used. The conductive layer may be backed by or integrated into substrates such as polyethylene terephthalate, polyethylene naphthalate, polyaramid, polyimide, polycycloolefin, polysulfone, epoxy and their composites. The conductor film may be coated with a radiation curable polymer precursor layer. The film and precursor layer are then exposed imagewise to radiation to form the microcell wall structure. Following exposure, the precursor material is removed from the unexposed areas, leaving the cured microcell walls bonded to the conductor film/support web. The imagewise exposure may be accomplished by UV or other forms of radiation through a photomask to produce an image or predetermined pattern of exposure of the radiation curable material coated on the conductor film. Although it is generally not required, the mask may be positioned and aligned with respect to the conductor film, i.e., ITO lines, so that the transparent mask portions align with the spaces between ITO lines, and the opaque mask portions align with the ITO material (intended for microcell floor areas).

Figure 6A:
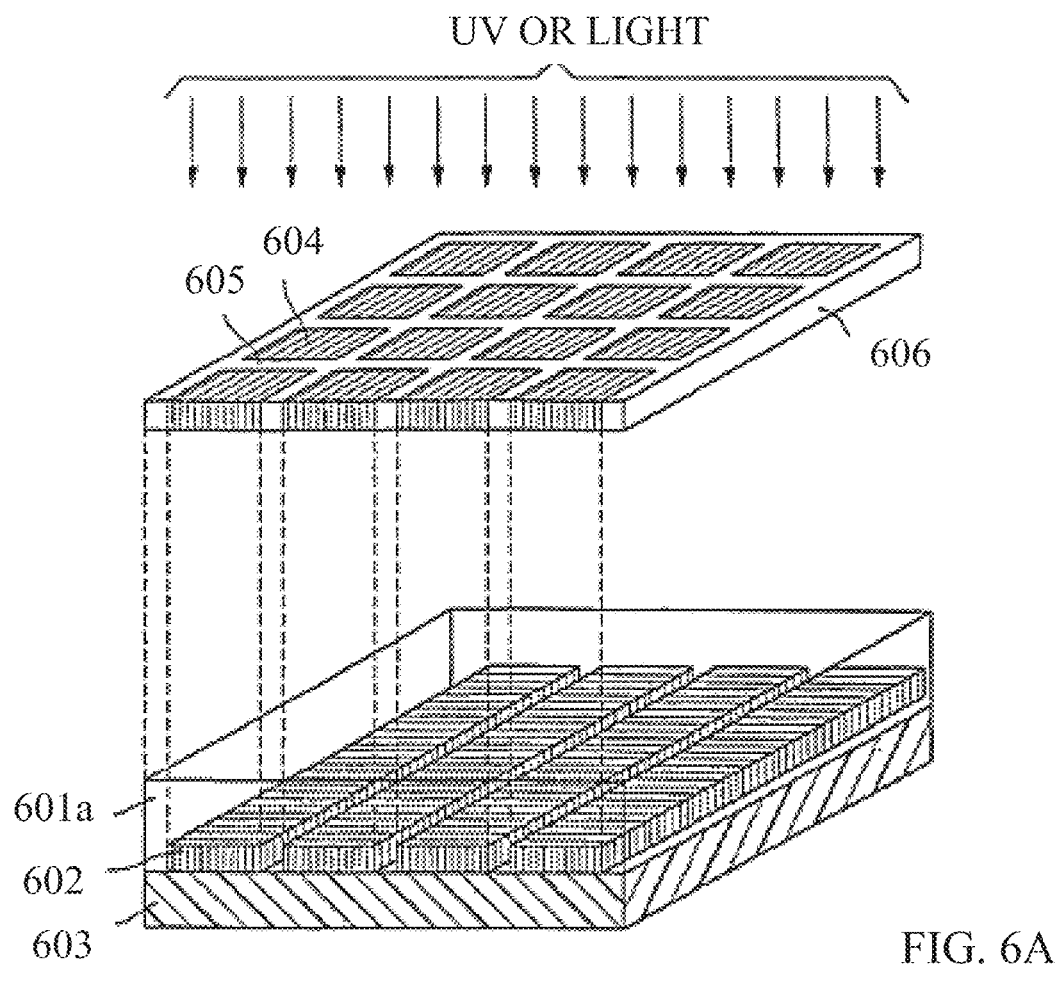
FIGS. 6A and 6B detail the production of microcells using photolithographic exposure through a photomask of a conductor film coated with a thermoset precursor.
Figure 6B:
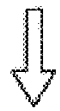
Figure 6B:
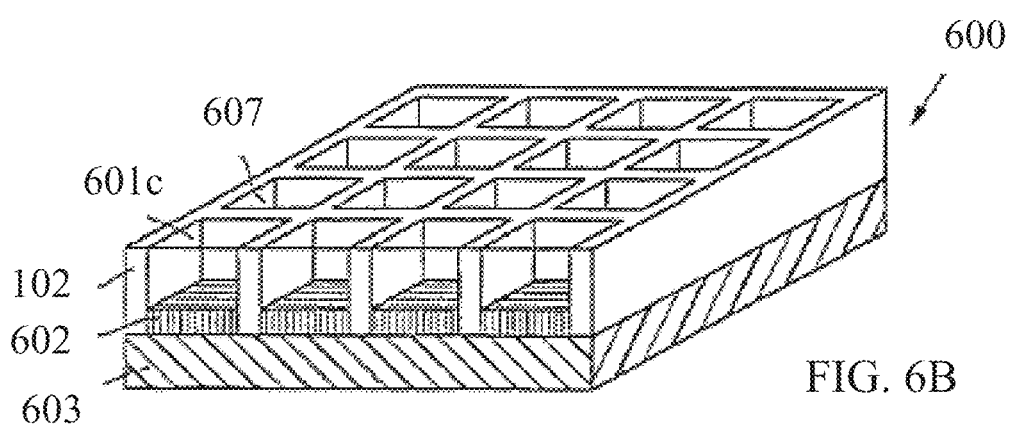

Photolithography. Microcells can also be produced using photolithography. Photolithographic processes for fabricating a microcell array are illustrated in FIGS. 6A and 6B. As shown in FIGS. 6A and 6B, the microcell array 600 may be prepared by exposure of radiation curable material 601a coated by known methods onto conductor film 602 to UV light (or, alternatively, to other forms of radiation, electron beams and the like) through mask 606 to form walls 102 corresponding to the image projected through mask 606. Base conductor film 602 is preferably mounted on a supportive substrate base web (603), which may comprise a plastic material.

In the photomask 606 in FIG. 6A, dark squares 604 represent the opaque area and the space between the dark squares represents transparent area 605 of mask 606. The UV radiates through transparent area 605 onto radiation curable material 601a. The exposure is preferably performed directly onto radiation curable material 601a, i.e., the UV does not pass through substrate 603 or base conductor film 602 (top exposure). For this reason, neither substrate 603 nor conductor film 602 needs to be transparent to the UV or to other radiation wavelengths employed.

As shown in FIG. 6B, exposed areas, such as walls 102, become hardened. The unexposed areas (protected by opaque area 604 of mask 606) are then removed by an appropriate solvent or developer to form microcells 607. The solvent or developer is selected from those commonly used for dissolving or reducing the viscosity of radiation curable materials, such as methylethylketone (MEK), toluene, acetone, isopropanol or the like. The preparation of the microcells may be similarly accomplished by placing a photomask underneath the conductor film/substrate support web. In this case, the UV light radiates through the photomask from the bottom and the substrate needs to be transparent to radiation.

Figure 6C:
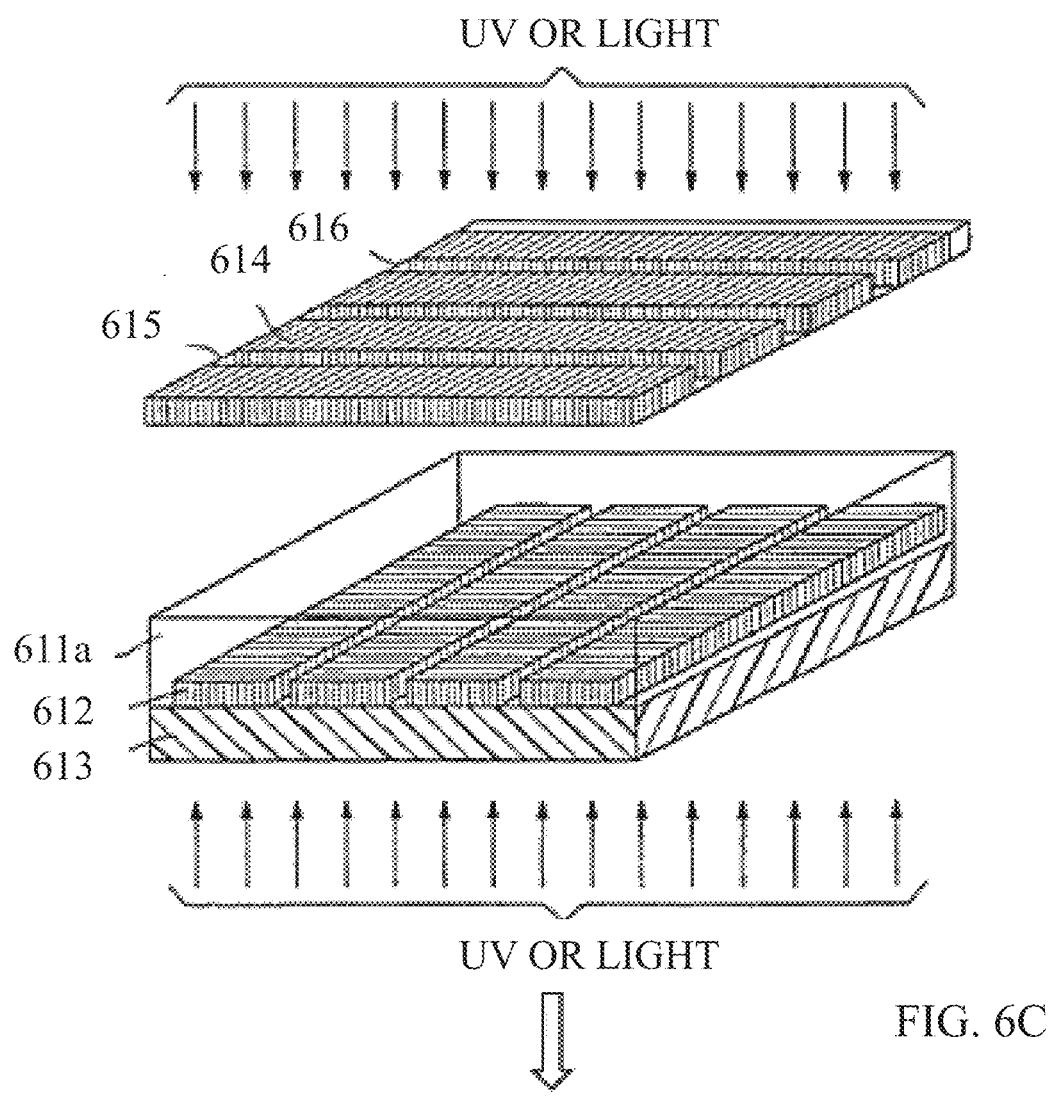
FIGS. 6C and 6D detail an alternate embodiment in which are fabricated using photolithography.
Figure 6D:
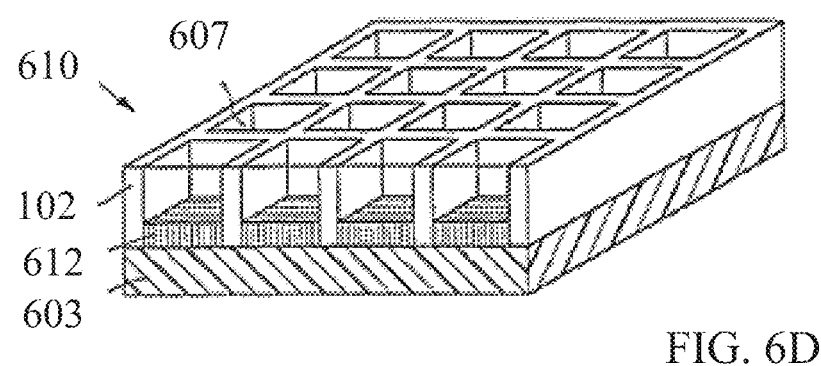

Imagewise Exposure. Still another alternative method for the preparation of the microcell array of the invention by imagewise exposure is illustrated in FIGS. 6C and 6D. When opaque conductor lines are used, the conductor lines can be used as the photomask for the exposure from the bottom. Durable microcell walls are formed by additional exposure from the top through a second photomask having opaque lines perpendicular to the conductor lines. FIG. 6C illustrates the use of both the top and bottom exposure principles to produce microcell array 610 of the invention. Base conductor film 612 is opaque and line-patterned. Radiation curable material 611a, which is coated on base conductor film 612 and substrate 603, is exposed from the bottom through conductor line pattern of 612, which serves as the first photomask. A second exposure is performed from the "top" side through second photomask 616 having a line pattern perpendicular to conductor lines of 612. Spaces 615 between lines 614 are substantially transparent to the UV light. In this process, wall material 611a is cured from the bottom up in one lateral orientation, and cured from the top down in the perpendicular direction, joining to form walls 102 of integral microcells 607. As shown in FIG. 6D, the unexposed area is then removed by a solvent or developer as described above to reveal microcells 607.

The microcells may be constructed from thermoplastic elastomers, which have good compatibility with the microcells and do not interact with the media. Examples of useful thermoplastic elastomers include ABA, and (AB)n type of di-block, tri-block, and multi-block copolymers wherein. A is styrene, α-methylstyrene, ethylene, propylene or norbornene; B is butadiene, isoprene, ethylene, propylene, butylene, dimethylsiloxane or propylene sulfide; and A and B cannot be the same in the formula. The number, n, is ≥1, preferably 1-10. Particularly useful are di-block or tri-block copolymers of styrene or ox-methylstyrene such as SB (poly(styrene-b-butadiene)), SBS (poly(styrene-b-butadiene-b-styrene)), SIS (poly(styrene-b-isoprene-b-styrene)), SEBS (poly(styrene-b-ethylene/butylenes-b-styrene)) poly(styrene-b-dimethylsiloxane-b-styrene), poly(α-methylstyrene-b-isoprene), poly(α-ene-b-isoprene-b-α-methylstyrene), poly(α-methylstyrene-b-propylene sulfide-b-α-methylstyrene), poly(α-methylstyrene-b-dimethylsiloxane-b-α-methylstyrene). Commercially available styrene block copolymers such as Kraton D and G series (from Kraton Polymer, Houston, Tex.) are particularly useful. Crystalline rubbers such as poly(ethylene-co-propylene-co-5-methylene-2-norbomene) or EDM (ethylene-propylene-diene terpolymer) rubbers such as Vistalon 6505 (from Exxon Mobil, Houston, Tex.) and their grafted copolymers have also been found very useful.

The thermoplastic elastomers may be dissolved in a solvent or solvent mixture, which is immiscible with the carrier in the microcells and exhibits a specific gravity less than that of the carrier. Low surface tension solvents are preferred for the overcoating composition because of their better wetting properties over the microcell walls and the fluid. Solvents or solvent mixtures having a surface tension lower than 35 dyne/cm, or lower than 30 dyne/cm, are preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane and decalin and the like), alkylbezenes (preferably mono- or di-$C_{1-6}$ alkyl benzenes such as toluene, xylene and the like), alkyl esters (preferably $C_{2-5}$ alkyl esters such as ethyl acetate, isobutyl acetate and the like) and $C_{3-5}$ alkyl alcohols (such as isopropanol and the like and their isomers). Mixtures of alkylbenzene and alkane are particularly useful.

In addition to polymer additives, the polymer mixtures may also include wetting agents (surfactants). Wetting agents (such as the EC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn.) may also be included in the composition to improve the adhesion of the sealant to the microcells and provide a more flexible coating process. Other ingredients including crosslinking agents (e.g., bisazides such as 4,4'-diazidodiphenylmethane and 2,6-di-(4'-azidobenzal)-4-methylcyclohexanone), vulcanizers (e.g., 2-benzothiazolyl disulfide and tetramethylthiuram disulfide), multifunctional monomers or oligomers (e.g., hexanediol, diacrylates, trimethylolpropane, triacrylate, divinylbenzene, diallylphthalene), thermal initiators (e.g., dilauroryl peroxide, benzoyl peroxide) and photoinitiators (e.g., isopropyl thioxanthone (ITX), irgacure 651 and irgacure 369 from Ciba-Geigy) are also highly useful to enhance the physico-mechanical properties of the sealing layer by crosslinking or polymerization reactions during or after the overcoating process.

The microcell array 700 may be prepared by any of the methods described above. As shown in cross-section in FIGS. 7A-7D, microcell walls 102 extend upward from backing layer 101 (bottom of microcells) and conducive layer 210, which can serve as the first light-transmissive electrode layer of the electro-optic device, to form the open microcells. in an embodiment, conductive layer 210 is formed on or at backing layer 101. While FIGS. 7A-7D show conductive layer 210 is continuous and running above backing layer 101, it is also possible that conductive layer 210 is continuous and running below or within backing layer 101 or it is interrupted by microcell walls 102.

The microcells are next filled with electrophoretic medium 225, which comprises charged particles in a nonpolar fluid to form a plurality of filled microcells. The microcells may be filled using a variety of techniques. In some embodiments, blade coating may be used to fill the microcells to the depth of microcell walls 102. in other embodiments, inkjet-type microinjection may be used to fill the microcells. In yet other embodiments, microneedle arrays may be used to fill a array of microcells with electrophoretic medium 225.

Figure 7A:
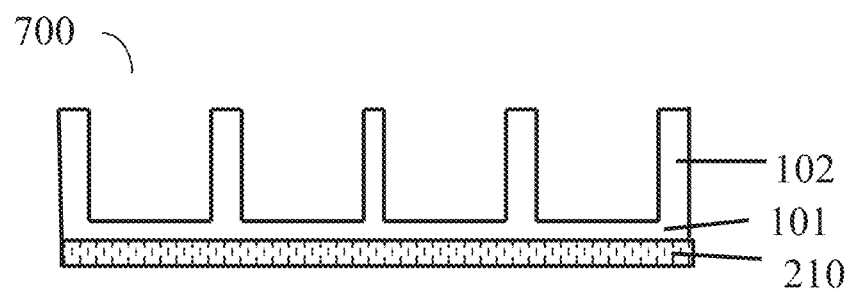
FIGS. 7A-7D illustrate the steps of filling and sealing an array of microcells.
Figure 7B:
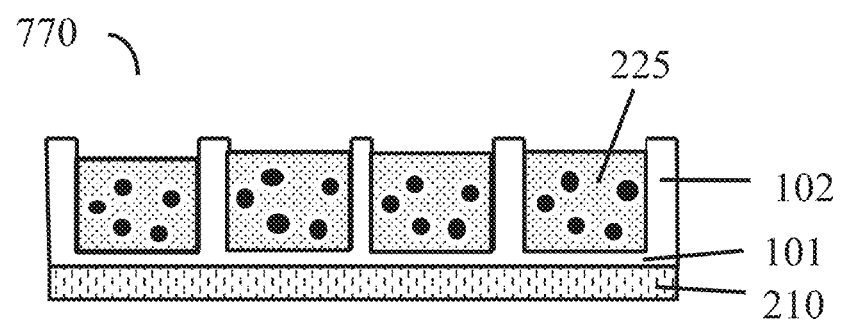
Figure 7C:
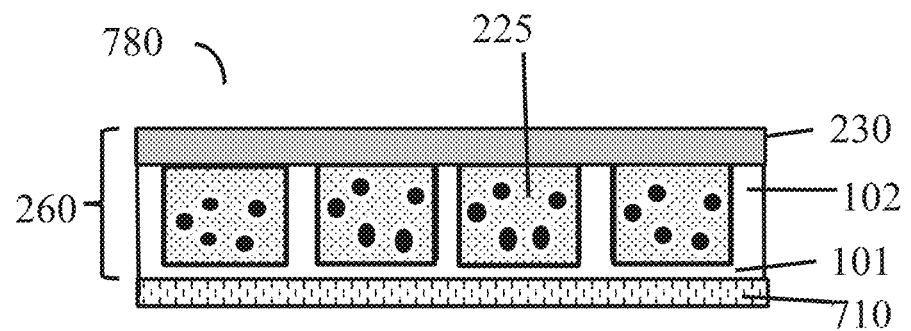

As shown in FIG. 7C, after filling, the microcells are sealed by applying an aqueous sealing composition to form sealed microcells 780, comprising sealing layer 230. In some embodiments, the sealing process may involve exposure to heat, dry hot air, or UV radiation. The sealing layer must have good barrier properties for the non-polar fluid of electrophoretic medium 225.

In alternate embodiments, a variety of individual microcells may be filled with the desired mixture by using iterative photolithography. The process typically includes coating an array of empty microcells with a layer of positively working photoresist, selectively opening a certain number of the microcells by image-wise exposing the positive photoresist, followed by developing the photoresist, filling the opened microcells with the desired mixture, and sealing the filled microcells by a sealing process. These steps may be repeated to create sealed microcells filled with other mixtures. This procedure allows for the formation of large sheets of microcells having the desired ratio of mixtures or concentrations.

The sealing of the filled microcells may be accomplished in a number of ways. One approach involves the mixing of the aqueous sealing composition with the electrophoretic medium composition. The aqueous sealing composition may be immiscible with the electrophoretic composition, preferably having a specific gravity lower than that of the electrophoretic medium composition. The two compositions, the aqueous sealing compositing and the electrophoretic medium composition, are thoroughly mixed and immediately coated onto the plurality of microcells with a precision coating mechanism such as Meyer bar, gravure, doctor blade, slot coating or slit coating. Excess fluid is scraped away by a wiper blade or a similar device. A small amount of a weak solvent or solvent mixture such as isopropanol, methanol or an aqueous solution thereof may be used to clean the residual fluid on the top surface of the partition walls of the microcells. The aqueous sealing composition is subsequently separated from the electrophoretic medium composition and floats on top of the electrophoretic medium liquid composition. Alternatively, after the mixture of the electrophoretic medium composition and the aqueous sealing composition is filled into the microcells, a substrate may be laminated on top to control the metering of the mixture of compositions and to facilitate the phase separation of the aqueous sealing composition from the electrophoretic medium composition to form a uniform sealing layer. The substrate used can be a functional substrate in the final structure or can be a sacrifice substrate, for example, a release substrate, which can be removed afterwards. A sealing layer is then formed by hardening the aqueous sealing composition in situ (i.e., when in contact with the electrophoretic medium composition). The hardening of the aqueous sealing composition may be accomplished by UV or other forms of radiation such as visible light, IR or electron beam. Alternatively, heat or moisture may also be employed to harden the aqueous sealing composition if a heat or moisture curable aqueous sealing composition is used.

In another approach, the electrophoretic medium composition may be filled into the microcells first and an aqueous sealing composition is subsequently overcoated onto the filled microcells. The overcoating may be accomplished by a conventional coating and printing process, such as blanket coating, inkjet printing or other printing processes. A sealing layer, in this approach, is formed in situ, by hardening the aqueous sealing composition by solvent evaporation, radiation, heat, moisture, or an interfacial reaction. Interfacial polymerization followed by UV curing is beneficial to the sealing process. Intermixing between the electrophoretic medium composition and the sealing overcoat is significantly suppressed by the formation of a thin barrier layer at the interface by interfacial polymerization. The sealing is then completed by a post curing step, for example, by UV radiation. The degree of intermixing may be further reduced by using an aqueous sealing composition that has lower specific gravity than that of the electrophoretic medium composition. Volatile organic solvents may be used to adjust the viscosity and thickness of the sealing overcoat. Rheology of the aqueous sealing composition may be adjusted for optimal sealability and coatability. When a volatile solvent is used in the overcoat, it is preferred that it is immiscible with the solvent in the electrophoretic medium composition.

Figure 7D:
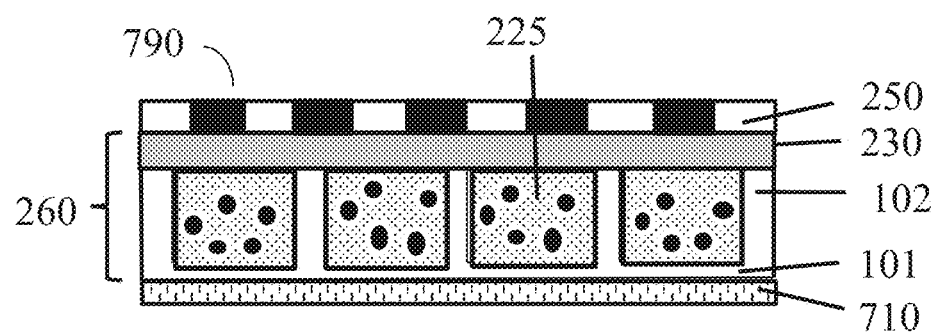

After the microcells are filled and sealed, the sealed array may be laminated with second electrode layer 250 comprising a plurality of electrodes. Second electrode layer 250 may be attached onto sealing layer 230 to form electro-optic device 790 as shown in FIG. 7D. An adhesive may be used to attach second electrode layer 250 onto sealing layer 230 (the adhesive layer is not shown in FIG. 7D. The adhesive may be electrically conductive. The adhesive of the adhesive layer, which may be a pressure sensitive adhesive, a hot melt adhesive, or a heat; moisture, or radiation curable adhesive. The laminate adhesive may be post-cured by radiation such as UV through the top conductive layer if the latter is transparent to the radiation. In other embodiments, the plurality of electrodes may be bonded directly to the sealed array of the microcell.

In general, the microcells can be of any shape, and their sizes and shapes may vary. The microcells may be of uniform size and shape in one system. However, it is possible to have microcells of mixed shapes and sizes. The openings of the microcells may be round, square, rectangular, hexagonal or any other shape. The size of the partition area between the openings may also vary. The dimension of each individual microcell may be in the range of about $1\times10^1$ to about $1\times10^6$ $\mu m^2$, from about $1\times10^2$ to about $1\times10^6$ $\mu m^2$, or from about $1\times10^3$ to about $1\times10^5$ $\mu m^2$.

The depth of the microcells may be in the range of about 5 to about 200 μm, or from about 10 to about 100 μm. The opening to the total area ratio is in the range of from about 0.05 to about 0.95, or from about 0.4 to about 0.9.

An electrophoretic display normally comprises an electro-optic material layer and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electro-optic material layer comprises an electrode, the layer on the opposed side of the electro-optic material layer typically being a protective layer intended to prevent the movable electrode damaging the electro-optic material layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating on a plastic film. Separately, a backplane, containing an array of pixel electrodes and an appropriate arrangement of conductors to connect the pixel electrodes to drive circuitry, is prepared. To form the final display, the substrate having the electro-optic material layer is laminated to the backplane using a lamination adhesive.

The aforementioned U.S. Pat. No. 6,982,178 describes a method of assembling a solid electro-optic display, which is well adapted for mass production. Essentially, this patent describes a so-called "front plane laminate" ("FPL") which comprises, in order, a light-transmissive electrode layer; an electro-optic material layer in electrical contact with light-transmissive electrode layer; an adhesive layer; and a release sheet. Typically, the light-transmissive electrode layer will be carried on a light-transmissive substrate, which is preferably flexible, in the sense that the substrate can be manually wrapped around a drum (say) 10 inches (254 mm) in diameter without permanent deformation. The substrate will typically be a polymeric film, and will normally have a thickness in the range of about 1 to about 25 mil (25 to 634 µm), preferably about 2 to about 10 mil (51 to 254 µm). The light-transmissive electrode layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate. Assembly of an electrophoretic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic material layer, and light-transmissive electrode layer to the backplane. This process is well adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises an electro-optic material layer sandwiched between two adhesive layers, one or both of the adhesive layers being covered by a release sheet. Another form of the double release sheet comprises a layer of a solid electro-optic material sandwiched between two release sheets. Both forms of the double release film are intended for use in a process generally similar to the process for assembling an electrophoretic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate may comprise, in order, at least one of a light-transmissive protective layer and a light-transmissive electrode layer; an adhesive layer; an electro-optic material layer; and a release sheet. This inverted front plane laminate is used to form an electro-optic device having a layer of lamination adhesive between the electro-optic material layer and the light-transmissive electrode layer; a second, typically thin layer of adhesive may or may not be present between the electro-optic material layer and a backplane. Such electro-optic displays can combine good resolution with good low temperature performance.

The electrophoretic display of the present invention may comprise a piezoelectric material layer comprising a piezoelectric material. Such electrophoretic display can be operated without the need of a power supply. This means that the structure of the electrophoretic display is simplified. The piezoelectric material layer may be positioned (a) between the electro-optic material layer and the first light-transmissive electrode layer, (b) between the electro-optic material layer and the second electrode layer, or (c) side-by-side next to the electro-optic material layer.

Piezoelectricity is the charge that accumulates in a solid material (piezoelectric material) in response to applied mechanical stress. Examples of piezoelectric materials include polyvinylidene fluoride (PVDF), quartz ($SiO_2$), berlinite ($AlPO_4$), gallium orthophosphate ($GaPO_4$), tourmaline, barium titanate ($BaTiO_3$), lead zirconate titanate (PZT), zinc oxide (ZnO), aluminum nitride (AlN), lithium tantalite, lanthanum gallium silicate, potassium sodium tartrate and any other known piezoelectric materials. The piezoelectric material layer may further comprise an ionic liquid.

Voltage generated by piezoelectricity may drive the pigments of an electrophoretic material layer to change the color or the image of the electrophoretic material when viewed from a viewing side of the display. For example, by bending or by introducing stress to an electro-optic display that comprises a piezoelectric material layer, voltage may be generated and this voltage can be utilized to cause movement of the color pigments of the electrophoretic material.

Figure 8:
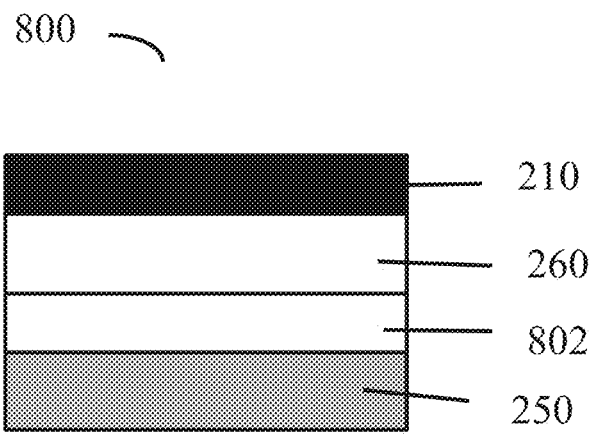
FIGS. 8-13 illustrate side views of electro-optic displays of the present invention, the displays comprising a piezoelectric material layer.

FIG. 8 shows an example of an electro-optic display comprising a piezoelectric material layer and a sealing layer according to the present invention. FIG. 8 is a cross sectional view of electro-optic display 800 comprising piezoelectric material layer 802 that can drive electro-optic material layer 260. The electro-optic displays comprises first light-transmissive electrode layer 210, electro-optic material layer 260, piezoelectric material layer 802, and second electrode layer 250. Piezoelectric material layer 802 is located between second electrode layer 250 and electro-optic material layer 260, whereas electro-optic material layer 260 is disposed between first electrode layer 210 and piezoelectric material layer 802. Electro-optic material layer 260 may comprise a plurality of microcells (not shown in FIG. 8), each of the plurality of microcells including a bottom, walls, and an opening, and containing an electrophoretic medium. A sealing layer (not shown in FIG. 8) according to the present invention spans the openings of the plurality of microcells. The sealing layer may be located adjacent to the piezoelectric material layer 802. The first light-transmissive electrode layer 210 may have the form of a single continuous electrode (also called conductive layer) and the second electrode layer 250 may comprise a plurality of pixel electrodes (matrix of pixel electrodes). The display may be bend by a user, generating a voltage sufficient to operate the display.

Figure 9:
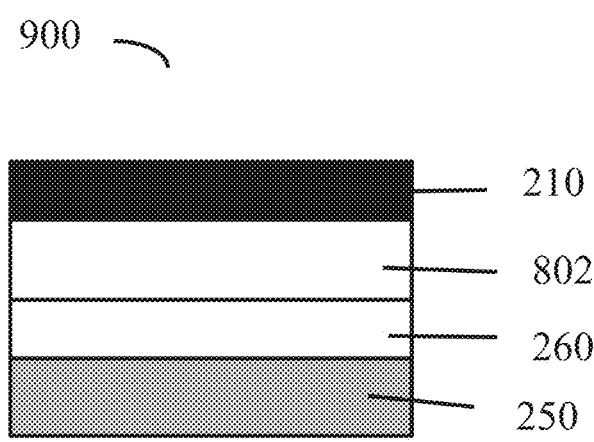

FIG. 9 illustrates a cross sectional view of another example of electro-optic display 900 comprising piezoelectric material layer 802 that can drive electro-optic material layer 260. The electro-optic material layer comprises first light-transmissive electrode layer 210, piezoelectric material layer 802, electro-optic material layer 260, and second electrode layer 250. Piezoelectric material layer 802 is located between first light-transmissive electrode layer 250 and electro-optic material layer 260, whereas electro-optic material layer 260 is disposed between second electrode layer 250 and piezoelectric material layer 802. Electro-optic material layer 260 may comprise a plurality of microcells (not shown in FIG. 9), each of the plurality of microcells including a bottom, walls, and an opening, and containing an electrophoretic medium. A sealing layer (not shown in FIG. 8) according to the present invention spans the openings of the plurality of microcells. The sealing layer may be located adjacent to second electrode layer 250. The sealing layer may be located adjacent to piezoelectric material layer 802. The electro-optic display may further comprise an adhesive layer (not shown in FIG. 9), the adhesive layer being disposed between electro-optic material layer 260 and second electrode layer 250. Specifically, piezoelectric material layer may be in contact with the sealing layer of electro-optic material layer 260. The first light-transmissive electrode layer 210 may have the form of a single continuous electrode (also called conductive layer) and the second electrode layer 250 may comprise a plurality of pixel electrodes (matrix of pixel electrodes).

Figure 10:
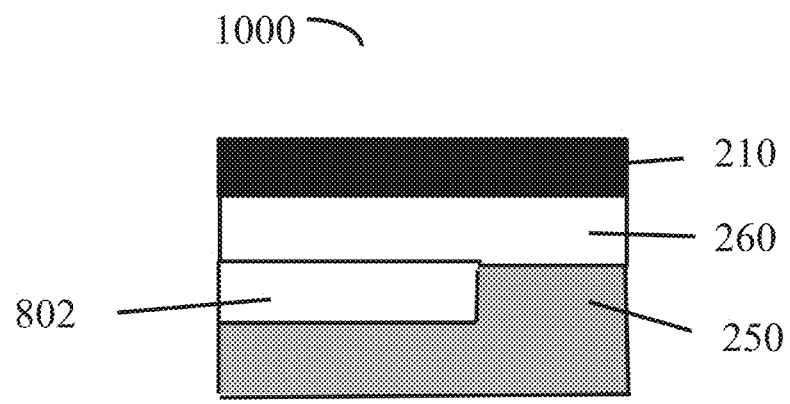

FIG. 10 illustrates a cross sectional view of an example of electro-optic display 1000 comprising (1) piezoelectric material layer 802 that can drive electro-optic material layer 260 and (2) a sealing layer according to the present invention. The electro-optic material layer comprises first light-transmissive electrode layer 210, electro-optic material layer 260, piezoelectric material layer 802, and second electrode layer 250. In this embodiment, piezoelectric material layer 802 is positioned between electro-optic material layer and second electrode layer 250. Piezoelectric material layer 802 overlaps with only a first portion of electrophoretic material layer 260. Second electrode layer 250 overlaps with all piezoelectric material layer 802 and a second portion of electro-optic material layer, wherein the second portion of electro-optic material layer does not overlap with piezoelectric material layer 802. The first portion of electro-optic material layer may comprise a first plurality of microcells (not shown in FIG. 10) and may have a first electrical resistance, while the second portion of electro-optic material layer may comprise a second plurality of microcells (not shown in FIG. 10) and may have a second electrical resistance. First light-transmissive electrode layer 210 is adjacent to electro-optic material layer 260 and on the other side of electro-optic material layer 260 in relation to piezoelectric material layer and second electrode layer 250 as illustrated in FIG. 10.

Each of the first and second plurality of microcells includes a bottom, walls, and an opening, and containing an electrophoretic medium. A sealing layer (not shown in FIG. 10) according to the present invention spans the openings of the first and second plurality of microcells. The sealing layer may be located adjacent to piezoelectric material layer 802 and second electrode layer 250 (on the side of the electro-optic material layer that is opposite to first light-transmissive electrode layer 210).

Figure 11:
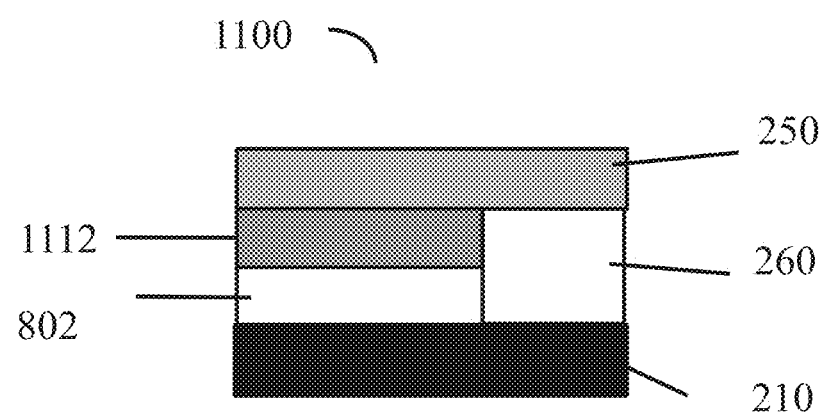

In another example, instead of having a piezoelectric material layer directly laminated onto or overlapping with an electro-optic material layer as shown in FIGS. 8, 9 and 10, a piezoelectric material layer 802 may be laminated onto a semi-conductive or high-resistive layer 1112, and then semi-conductive or high-resistive layer 1112 is laminated on first light-transmissive electrode layer 210, as shown in FIG. 11. In this configuration, electro-optic display 1100 comprises a semi-conductive or high-resistive layer 1112. The a semi-conductive or high-resistive layer 1112 replaces portions of electro-optic material layer 260 on top of piezoelectric material layer 802, thereby reducing the overall thickness of the display, as well as preventing a fast dissipation of charges across the piezoelectric material layer 802 so the locally produced charges (by the piezoelectric material layer 802) may be effectively and efficiently applied onto electro-optic material layer 260. This results in an improvement of the display contrast ratio. First light-transmissive electrode layer 210 and second electrode layer 250 sandwich electro-optic material layer 260, semi-conductive or high-resistive layer 1112, and piezoelectric material 802 layers as shown in FIG. 11. Electro-optic material layer 260 may comprise a plurality of microcells (not shown in FIG. 11), each of the plurality of microcells including a bottom, walls, and an opening, and containing an electrophoretic medium. A sealing layer (not shown in FIG. 11) according to the present invention spans the openings of the plurality of microcells. The sealing layer (not shown in FIG. 11) may be located adjacent to first electrode layer 210. The sealing layer (not shown in FIG. 11) may be located adjacent to second electrode layer 250.

Figure 12:
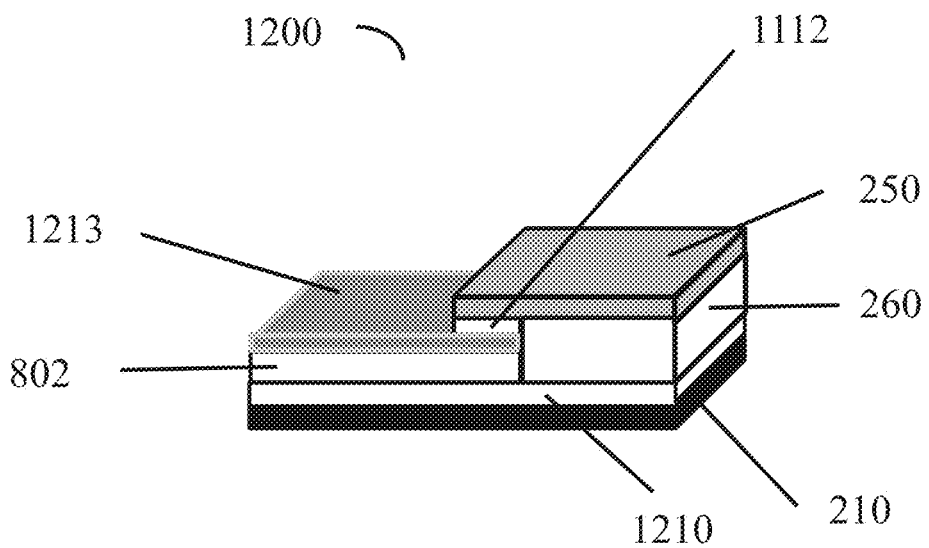

In another example, FIG. 12 illustrates a cross sectional view of electro-optic display 1200 that comprises a piezoelectric layer and a sealing layer according to the present invention. Display 1200 differs from the display illustrated in FIG. 11 in that only a portion of piezoelectric material layer 802 overlaps with first light-transmissive electrode layer 210. In this configuration, piezoelectric material layer 802 can avoid being placed in a neutral plane position, such that better images may be generated from piezoelectric material layer 802. In addition, piezoelectric material layer 802 may be a metalized piezoelectric material layer and may be covered by a metal layer 1213. In some embodiment, first semi-conductive layer 1112 may be positioned between metal layer 1213 and first electrode light-transmissive layer 210. Another semi-conductive layer, second semi-conductive layer 1210, may be positioned between piezoelectric material layer 802 and second electrode layer 250. It should be appreciated that all the layers presented herein, including first electrode layer 210 and second electrode layer 250 may be light-transmissive, such that this display may be viewed from either direction or orientation. Electro-optic material layer 260 may comprise a plurality of microcells (not shown in FIG. 12), each of the plurality of microcells including a bottom, walls, and an opening, and containing an electrophoretic medium. A sealing layer (not shown in FIG. 12) according to the present invention spans the openings of the plurality of microcells. The sealing layer (not shown in FIG. 12) may be located adjacent to second electrode layer 250. The sealing layer (not shown in FIG. 12) may be located adjacent to second semi-conductive layer 1210.

Figure 13:
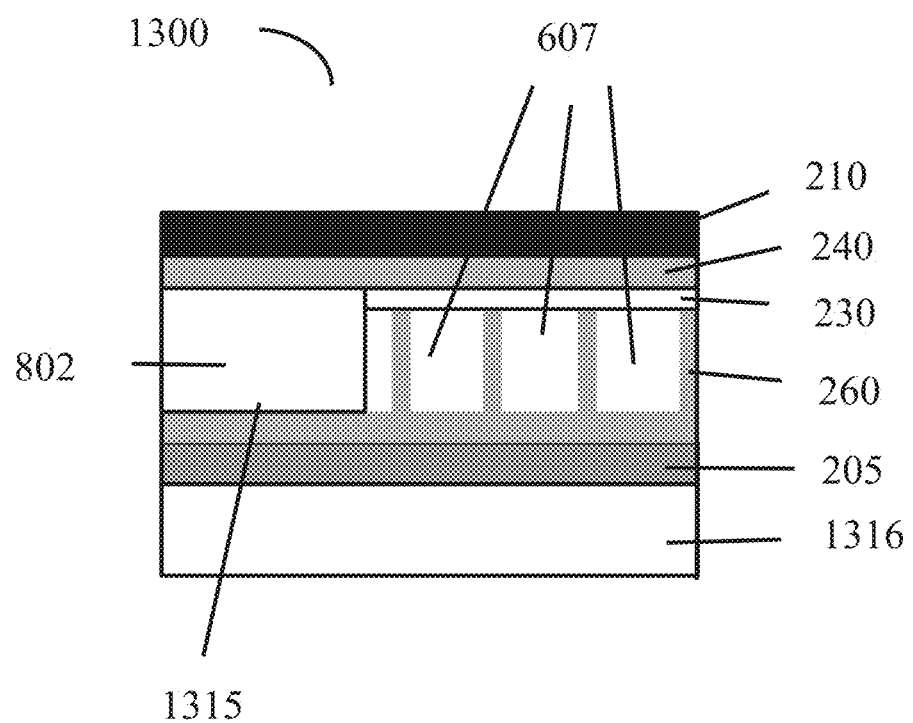

FIG. 13 illustrates a cross sectional view of yet another example of an electro-optic display 1300. Electro-optic display 1300 comprises a piezoelectric material layer and a sealing layer in accordance with the present invention. As shown in FIG. 13, electro-optic material layer 260 may partially extend underneath piezoelectric material layer 802 to overlap, ensuring a secured connection with piezoelectric material layer 802. In this example, electro-optic display layer 260 may have one portion having microcells 607 and another portion 1315 that is substantially flat and configured for establishing a connection with piezoelectric material layer 802. In this configuration, piezoelectric material layer 802 is positioned to overlap on the substantially flat portion 1315, ensuring a good connection with electro-optic material layer 260. This configuration can advantageously establish a strong connection between piezoelectric material layer 802 and electro-optic material layer 260. For example, this configuration offers a robust connection between piezoelectric material layer 802 and electro-optic material layer 260 that is capable of withstanding repeated bending or applied stress onto electro-optic display 1300. Additionally, an adhesive layer 240 may be placed between piezoelectric material layer 802 and first light-transmissive electrode layer 210. Each of microcells 607 comprise an opening and sealing layer 230 spans each microcell opening. Furthermore, a second electrode layer 250 is adjacent to electro-optic material layer 260. Second electrode layer 250 is disposed between substrate 1316 and electro-optic material layer 260.

The sealing layers in the examples of electro-optic displays illustrated by FIGS. 8, 9, 10, 11, 12, and 13 are water-resistant. The sealing layers comprise from 40 to 95 weight percent of a poly(vinyl alcohol) by weight of the sealing layer excluding solvents, the poly(vinyl alcohol)

containing an acetoacetate functional group in its molecular structure; and from 5 to 60 weight percent of a polyurethane by weight of the sealing layer excluding solvents.

Electrophoretic Medium

The electrophoretic medium, in the context of the present invention, refers to the composition in the microcells. For display applications, the microcells may be filled with at least one type of charged pigment particles in a non-polar fluid. The electrophoretic medium may comprise one type of charged type of particles or more than one type of particles having different colors, charges and charge polarities. The charged particles move through the electrophoretic medium under the influence of an electric field applied across the electro-optic material layer. The charged particles may be inorganic or organic pigments having polymeric surface treatments to improve their stability. The electrophoretic medium may comprise pigments having white, black, cyan, magenta, yellow, blue, green red, and other colors. The electrophoretic medium may also comprise, charge control agents charge adjuvants, rheology modifies, and other additives. Examples of non-polar fluids include hydrocarbons such as Isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

The electrophoretic medium may comprise two or more types of charged particles. The electrophoretic medium may comprise four types of charged particles, a first, second type, third type, and fourth types of charged particles. The first, second, third, and fourth types of charged particles may comprise a first, second, third, and fourth types of pigment, having a first, second, third, and fourth color, respectively. First, second, third, and fourth colors may be different from each other. The first type of particles may comprise inorganic pigment and has a first charge polarity. The second and third types of particles may have a second charge polarity that is opposite to second charge polarity. The fourth type of particles may have first charge polarity or second charge polarity. The first type of particles may be white. The second, third, and fourth charged particles may have colors selected from the group consisting of cyan, magenta, and yellow.

Sealing Layer

The sealing layer must provide a barrier to the electrophoretic medium so that the non-polar fluid will not be removed from the plurality of microcells. Furthermore, because the sealing layer is in contact with the electrophoretic medium and seals it inside the microcavities, it must be (1) practically insoluble in the non-polar fluid of the electrophoretic medium, and (2) a good barrier to the non-polar fluid, so that the non-polar fluid does not diffuse out form the microcells during the life of the device. Inferior barrier properties of the sealing layer towards the non-polar fluids lead to the reduction of the fluid from the electrophoretic medium and sagging of the sealing layer. In certain applications, where the electrophoretic device may be exposed to harsh conditions such as exposure to water or even insertion in water, the sealing layer also needs to be water-resistant. That is, the sealing layer must be resilient in water and must protect the electrophoretic medium under such conditions. The sealing layer must not negatively affect the electro-optic performance of the device.

The inventors of the present invention found that sealing layers comprising a combination of poly(vinyl alcohol) and polyurethane, the poly(vinyl alcohol) containing an acetoacetate functional group in its molecular structure provide such benefits. The poly(vinyl alcohol) that is used for the formation of the sealing layer may be water soluble.

An example of poly(vinyl alcohol) that contains an acetoacetate functional group in its molecular structure is GOHSENX™ Z-410 supplied by Mitsubishi Chemical. This material is crosslinkable and it can be crosslinked by thermal treatment or via exposure to UV radiation. Other commercially available examples of poly(vinyl alcohol) that contains an acetoacetate functional group in its molecular structure include GOHSENX™ Z-100, GOHSENX™ Z-200, GOHSENX™ Z-205, GOHSENX™ Z-210, GOHSENX™ Z-220, GOHSENX™ Z-300, and GOHSENX™ Z-320. The poly(vinyl alcohol) may be a copolymer formed via polymerization of vinyl alcohol and vinyl acetoacetate. The poly(vinyl alcohol) may be a terpolymer formed via polymerization of vinyl alcohol, vinyl acetate, and vinyl acetoacetate. The sealing layer comprises from 40 weight percent to 95 weight percent of poly(vinyl alcohol), which contains an acetoacetate functional group in its molecular structure, by weight of the sealing layer excluding solvents. The sealing layer may comprise from 45 weight percent to 93 weight percent, or from 50 weight percent to 90 eight percent, or from 55 weight percent to 85 weight percent, or from 60 weight percent to 80 weight percent, or from 65 weight percent to 78 of poly(vinyl alcohol), which contains an acetoacetate functional group in its molecular structure, by weight of the sealing layer excluding solvents. The poly(vinyl alcohol), which contains an acetoacetate functional group in its molecular structure, may have a degree of hydrolysis of from 90 percent to 99 percent, or from 91 percent to 98 percent, or from 92 percent to 96 percent. The poly(vinyl alcohol), which contains an acetoacetate functional group in its molecular structure, may have number average molecular weight from 1,000 to 1,000,000 Daltons, or from 10,000 to 800,000 Daltons, or from 20,000 to 700,000 Daltons, or from 40,000 to 600,000 Daltons. The poly(vinyl alcohol) of the sealing layer may be crosslinked. Crosslinked poly(vinyl alcohol) may be formed by the reaction of a crosslinking agent with starting (non crosslinked) poly(vinyl alcohol). The crosslinking reaction may take place at the hydroxyl groups or the acetoacetate functional groups of the poly(vinyl alcohol). The crosslinker reacts with two or more poly(vinyl alcohol) polymer molecules, forming bonds between the polymers. The bonds may be covalent bonds. The crosslinker may have two or more reactive functional groups, such as alcohol, amine, and aldehyde. Non-limited typical examples of classes of crosslinker include diamines, polyamines, diols, polyols, dialdehydes, dihydrazides, organic titanates, organic zirconates, and organic borates. The crosslinker may be a saturated dialadehyde having 2 to 6 carbon atoms, such as glyoxal.

Other examples of poly(vinyl alcohol) crosslinkers include methoxylenediamine, 1,3-bis(aminomethyl)cyclohexane, adipoyidihydrazide, $ZrO(OH)Cl \cdot nH_2O$, $(NH_4)_2ZrO(CO_3)_2$, Sequarez 755, and Safelink™ SPM-01.

The crosslinked poly(vinyl alcohol), which contains an acetoacetate functional group in its molecular structure, may be formed by a crosslinkable poly(vinyl alcohol) and a crosslinker. The crosslinker has a pot life of more than 1 day. The crosslinker may have pot life of more than 2 day, more than 3 days, more than 5 days, or more than 7 days.

The sealing layer of the present invention comprises from 5 weight percent to 60 weight percent of polyurethane by weight of the sealing layer excluding solvents. The sealing layer may comprise from 10 weight percent to 55 weight percent, or from 15 weight percent to 50 eight percent, or from 18 weight percent to 45 weight percent, or from 20 weight percent to 40 weight percent, or from 22 weight percent to 35 weight percent of polyurethane by weight of the sealing layer excluding solvents. The polyurethane may be an ester polyurethane or a polycarbonate polyurethane. The polyurethane may have number average molecular weight from 1,000 to 2,000,000 Daltons, from 5,000 to 1,500,000 Daltons, from 10,000 to 1,000,000 Daltons, or from 30,000 to 800,000 Daltons. The polyurethane of the sealing layer may be crosslinked. The crosslinked polyurethane may be formed by crosslinking of a crosslinkable polyurethane using a crosslinker. The crosslinker may be a polyisocyanate, a multifunctional polycarbodiimide, a multifunctional aziridine, a silane coupling agent, a boron/titanium/zirconium-based crosslinker, or a melamine formaldehyde. The poly(vinyl alcohol) and the polyurethane of the same sealing layer may be both crosslinked.

Polyurethanes are typically prepared via a polyadditional process involving a diisocyanate. Non-limiting examples of polyurethanes include polyether polyurethanes, polyester polyurethanes, polycarbonate polyurethanes, polyether polyureas, polyureas, polyester polyureas, polyester polyureas, polyisocyanates (e.g., polyurethanes comprising isocyanate bonds), and polycarbodiimides (e.g., polyurethanes comprising carbodiimide bonds). Generally, the polyurethane contains urethane groups. The polyurethanes utilized in the aqueous sealing compositions and sealing layers described herein may be prepared using methods known in the art. Preferably, the polyurethanes of the aqueous sealing composition and sealing layer of the present inventions are polyester polyurethanes, polycarbonate polyurethanes, and mixtures thereof.

The polyurethane of the sealing layer of the present invention may have high crystallinity, as determined by X-Ray Diffraction methodology (XRD). Typically, polyurethanes have a segment structure. That is, a hard segment, which is derived from the isocyanate component (or the chain extender, if present), and a soft segment, which is derived from the diol (or polyol) component. The nature and molecular structure of the monomers used for the polyurethane synthesis play critical role on the properties of the hard and soft segments. Typically, the crystallinity of the polyurethane can be controlled by the selection of the diol (or polyol) monomer.

The inventors of the present invention observed that the use of polyurethanes with specific melting characteristics show improved water resistance of the corresponding sealing layer. Specifically, polyurethanes having Peak Melting Temperature (Tm) of 115° C. and higher and Index of Crystallinity (Ic) of 8% and higher show improved water resistance. Peak Melting Temperature (Tm) and Index of Crystallinity (Ic) were measured by Differential Scanning Calorimetry (DSC). The DSC method involves an increase of the temperature of the polyurethane sample from 30° C. to 220° C. at a rate of 10° C. The heat flow is determined at the various temperatures. The lowest point of the line of the heat flow (in W/g) versus temperature is the Peak Melting Temperature (Tm). The area of the graph (between the baseline and the line of the heat flow) corresponds to the enthalpy of melting (expressed in J/g). The Index of Crystallinity (Ic) was determined as a ratio of the (A1/A) times 100, wherein A is the area between the baseline and the line of the heat flow. Area A1 is the area that corresponds to the area of the graph below the Peak Melting Temperature, the area A1 defined by a straight line that connects the lowest point of the graph (corresponding to the Peak Melting Temperature) and the point that the baseline that corresponds to the Onset Temperature.

The sealing layer may comprise a ratio a weight ratio of poly(vinyl alcohol) to polyurethane of from 19 to 0.7, or from 15 to 0.8, or from 10 to 1, or from 8 to 1.5, or from 5 to 2.

The sealing layer of the present invention may further comprise a surfactant. The aqueous sealing composition (and the corresponding sealing layer) may also comprise a wetting agent, also called surfactant. Examples of wetting agents include FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn. Wetting agents may increase the affinity between the sealing layer and the microcells, enhance the interfacial area between them, and improve the adhesion of the sealing layer to the microcells and provide a more flexible coating process. The surfactant may be an acetylenic diol. Non-limiting examples of acetylenic diols are 7,10-dimethyl-8-hexadecyne-7,10-diol, 4,7-dimethyl-5-decyne-4,7-diol, 2,4,7,9-tetramethyl-5-decyne-4,7-diol, and 3,6-dimethyl-4-octyne-3,6-diol. Commercial products of acetylenic diols include DYNOL™ 607, DYNOL™ 604, Surfynol® 104, Surfynol® 465, Surfynol® 440, Surfynol® 485, Surfynol® 2502, and Surfynol® FS-85. DYNOL™ and Surfynol™ surfactants are supplied by Evonik. The surfactant may be an organosilicone surface tension reducing agent, such as Silwet® L-7607, which is supplied by Momentive.

The sealing layer may be formed by an aqueous sealing composition. The aqueous sealing composition may comprise (i) from 40 to 95 weight percent of a poly(vinyl alcohol), which contains an acetoacetate functional group in its molecular structure, by weight of the aqueous sealing composition excluding solvents, and (ii) from 5 to 60 weight percent of a polyurethane by weight of the aqueous sealing composition excluding solvents; and (iii) and an aqueous carrier.

The aqueous sealing composition may comprise an aqueous carrier from 5 to 98 weight percent, or from 10 to 90 weight percent, or from 15 to 80 weight percent, or from 20 to 70 weight percent, or from 25 to 60 weight percent by weight of the aqueous sealing composition.

Application, drying or curing of the aqueous sealing composition forms the sealing layer. The sealing layer may have some residual water and other solvents that remain in the sealing layer after drying or curing.

The polyurethane may be added in the aqueous sealing composition as an aqueous solution or an aqueous dispersion or an aqueous emulsion, or a latex.

The aqueous sealing composition may comprise from 0.5 to 10 weight percent of a polyurethane crosslinker by weight of the aqueous sealing composition excluding solvents. The polyurethane crosslinker forms chemical bonds between the polyurethane of the aqueous sealing composition and polymer molecules of the microcells, increasing the adhesion between the sealing layer and the microcells. The polyurethane crosslinker is preferably soluble or dispersible in the aqueous carrier of the sealing composition. The polyurethane crosslinker may be a monomer, an oligomer or a polymer. Examples of polyurethane crosslinkers include polyisocyanates, multifunctional polycarbodiimides, multifunctional aziridines, silane coupling agents, boron/titanium/zirconium-based crosslinkers, or melamine formaldehydes. Polycarbodiimide crosslinkers are reactive at acidic pH conditions. Preferably, the crosslinker is free of sulfosuccinate surfactants.

The aqueous sealing composition may comprise from 0.1 to 10 weight percent of a poly(vinyl alcohol) crosslinker by weight of the aqueous sealing composition excluding solvents.

The aqueous sealing composition is prepared by mixing the ingredients in a water carrier. The aqueous sealing composition can be applied on the appropriate surface to form the sealing layer. The aqueous sealing composition may be used for the formation of the sealing layer immediately after its preparation or, more typically, a few hours or a few days after its preparation. In the case that the aqueous sealing composition needs to be stored for a period of time before its use, care must be taken to obtain an aqueous sealing composition that is stable over time. For example, the aqueous sealing composition must be a fluid with sufficiently low viscosity so that it can be successfully applied to form the sealing layer. This means that the aqueous sealing composition must have a sufficiently long pot life. In some cases, the poly(vinyl alcohol) crosslinker, if present, can cause the viscosity of the aqueous sealing composition to increase to a level that prevents its use to form the sealing layer. Thus, care must be taken to utilize poly(vinyl alcohol) crosslinkers that lead to aqueous composition having sufficiently long pot life. The aqueous sealing composition may have pot life longer than 1 day, longer than 3 days, longer than 5 days, or longer than 7 days. Non-limiting examples of poly(vinyl alcohol) crosslinker that provide long pot lives include Safelink™ SPM-01, supplied by Mitsubishi Chemical, glyoxal, and organic zirconates, such as $ZrO(OH)Cl*nH_2O$ (supplied as ZIRCOZOL ZC-2 by Daiichi Kigenso Kagaku Kogyo Co., Ltd) and $(NH_4)_2ZrO(CO_3)_2$ (supplied as ZIRCOZOL AC-7 by Daiichi Kigenso Kagaku Kogyo Co., Ltd.

The aqueous sealing composition may also comprise a pH adjusting agent. The pH adjusting agent is added into the aqueous sealing composition to adjust its pH to a value of from 6.5 to 8.5. An example of a pH adjusting agent is ammonium hydroxide, but a variety of acids and bases can be used. The pH adjusting agent increases the pH of the aqueous sealing composition, which may decrease the rate of crosslinking of the aqueous sealing composition before its use, and provides optimum pH condition for the rheology modifier to interact with the particles of the aqueous sealing composition, improving its efficacy. The pH adjusting agent may be used at a content of from 0.2 to 1 weight percent by weight of the sealing composition excluding solvents.

The aqueous sealing composition (and the resulting sealing layer) may also comprise from 0.05 to 10 weight percent, or from 0.1 to 5 weight percent, or from 0.5 to 2 weight percent of a rheology modifier by weight of the aqueous sealing composition (and the corresponding sealing layer) excluding solvents. The rheology modifier increases the stability of the aqueous sealing composition during its storage. It also facilitates film formation, improve sealing stability, and provide other functions. Examples include associative thickeners, alkali swellable acrylic emulsions, and other polymeric thickeners. The aqueous sealing composition may comprise hydrophobically-modified alkali swellable acrylic emulsion as rheology modifier, such as Solthix™ A-100 supplied by Lubrizol. The aqueous sealing composition may be shear thinning, that is to say, its viscosity is reduced at higher shear. For example, the rheology profile of the aqueous sealing composition may show a reduction of the viscosity between viscosity at shear rate of $10^{-4}$ 1/s and the viscosity at shear rate of $10^2$ 1/s by 5 times to 10,000 times.

These and other aspects of the present invention will be further appreciated upon consideration of the following Examples, which are intended to illustrate certain particular embodiments of the invention but are not intended to limit its scope, as defined by the claims.

EXAMPLES

Methods of Evaluation of Aqueous Sealing Compositions and Sealing Layers

A. Example of Preparation of the Aqueous Sealing Compositions that Form Sealing Layers Example of preparation of aqueous sealing composition. Into a container, an aqueous polyurethane dispersion were combined with a surfactant, and an aqueous solution of poly(vinyl alcohol). The dispersion was mixed for 10 minutes at 90 rpm using a Hei-torque Value 200 overhead mixer. Then, the appropriate amount of a polyurethane crosslinker was added, the appropriate amount of a poly(vinyl alcohol) crosslinker was added, and the dispersion was mixed for an additional 60 minutes at 90 rpm. The pH was then adjusted to 6.5-8.5 using ammonium hydroxide and the dispersion was mixed for an additional 30 minutes. The appropriate amount of a rheology modifier was added into the dispersion dropwise and the mixing continued for another 60 minutes. Then, the dispersion was degassed under reduced pressure (25 mmHg) for 5 days. The resulting aqueous sealing composition was used for the preparation of a sealing layer of the corresponding display.

B. Example of Preparation of Sealing Layer Using a Drawdown Method

The aqueous sealing composition prepared in A above was coated on the Indium-Tin Oxide (ITO) side of an ITO-PET film using a Gradco drawdown coater. A 15-mil gap and an eight path square applicator was used. The drawdown speed was set at 2 m/min to target a dry film thickness of 30+/−2 μm. The coating was dried at a 100° C. oven for 15 minutes. The dried film was conditioned at 25° C. and 55% relative humidity (RH) for 24 hours.

C. Evaluation of Barrier Property of Sealing Layers Towards Non-Polar Fluids

Figure 14A:
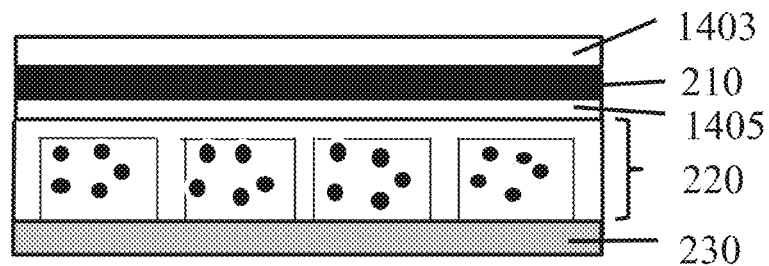
FIGS. 14A and 14B illustrate the structure of the electro-optic device that were used for the evaluation of the aqueous sealing composition examples and the corresponding sealing layers.
Figure 15A:
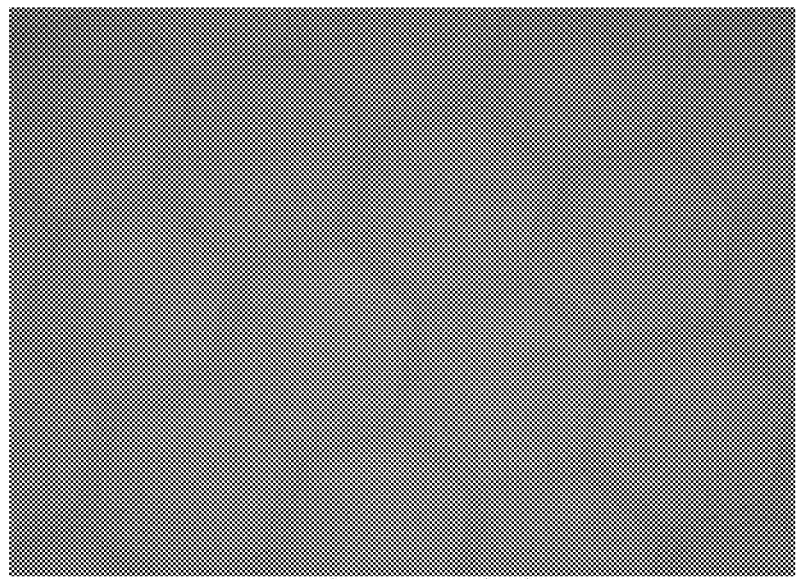
FIGS. 15A and 15B show microscope images of microcells evaluated for barrier properties.
Figure 15B:
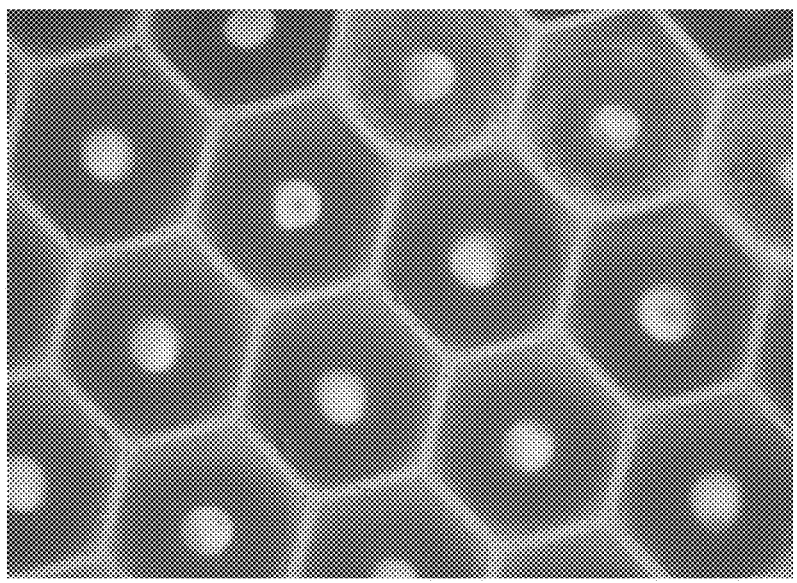

The aqueous composition that was prepared in section A above was used to form a sealing layer of display 1400 illustrated in FIG. 14A. The sealing layer was formed by the method described in B above. Display 1400 comprised in order: substrate 1403, first light-transmissive electrode layer 210 (conductive layer), primer layer 1405, microcell layer 220, and sealing layer 230. The microcell included an electrophoretic medium comprising pigment particles in Isopar E. Device 1400 was stored at 70° C. for at least 24 hours. After this period, the electro-optic display was inspected using an optical microscopy for sagging of the sealing layer caused by the loss of the non-polar fluid of the electrophoretic medium. If the distance between the bottom of the inspected microcavity and the lowest point of the bottom surface of the sealing layer is less than 85% of the distance between the bottom of the microcavity and the highest point of the lower surface of the sealing layer at the same microcell, the sealing layer is labeled as FAIL for its barrier property. Otherwise, that is, if the distance between the bottom of the inspected microcell and the lowest point of the sealing layer is 85% or more of the distance between the bottom of the microcell and the highest point of the bottom surface of the sealing layer at the inspected microcell, the sealing layer is labeled as PASS for its barrier property. The barrier property evaluation may also be performed qualitatively by observing the prepared electro-optic device by an optical microscopy looking from the viewing side of the display. Displays that comprise severely sagged sealing layers have significantly different appearance from devices that comprise sealing layers with good barrier property towards non-polar fluids (non-uniform versus uniform surface). For example, microcells having the sealing layer that appears uniform as shown in FIG. 15A, as opposed to microcells having sealing that appears non-uniform as shown in FIG. 15B.

D. Preparation for the Electro-Optic Display

Figure 14B:
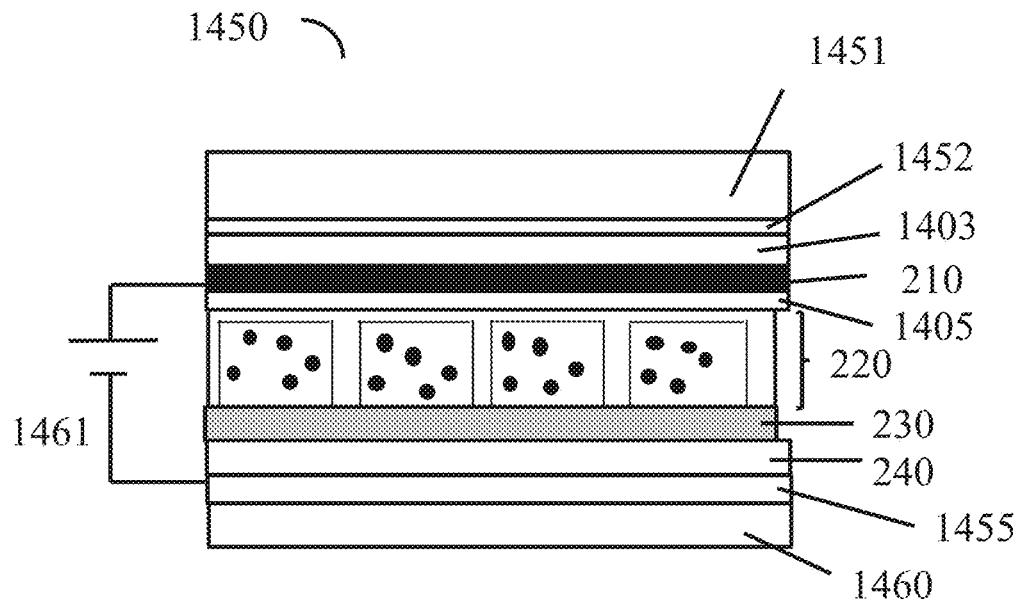

An electro-optic device was prepared by filling a plurality of microcells with a mixture of charged pigment particles (white, black, and red) in Isopar E, followed by coating of an aqueous sealing composition as described in B above. The display illustrated in FIG. 14B was constructed. Electro-optic display 1450 comprised in order: protective film 1451, first adhesive layer 1452 that is optically clear, substrate 1403, a first light-transmissive electrode layer 210 (conductive layer), primer layer 1405, microcell layer 220, sealing layer 230, second adhesive layer 240, ITO electrode layer 1455, and Glass layer 1460. A source of electric field 1461 electrically connected first light-transmissive electrode layer 210 (conductive layer) with ITO electrode layer 1455. First light-transmissive layer 210 had approximate thickness of 25 μm. Substrate 1453 had approximate thickness of 100 μm. Primary layer 1405 had approximate thickness of 0.4 μm. Microcell layer 220 comprised a plurality of microcells. Each microcell had an approximate bottom thickness of 0.4 μm and approximate height of 14 μm. Sealing layer 230 had approximate thickness of 10 μm and the second adhesive layer had approximate thickness of 6 μm.

E. Evaluation of Water Resistance of the Sealing Layer

E1. The electro-optic display prepared in D above was switched to its red state and then submerged in a beaker containing water of neutral pH at 25° C. for 2 hours. After this period, the display was removed from the beaker and inspected visually.

E2. The electro-optic display prepared in D above was switched to its red state and then submerged in a beaker containing water of neutral pH at 100° C. for 15 minutes. After this period, the display was removed from the beaker and inspected visually.

Determination of electro-optic displays for water resistance. After the removal of the electro-optic display from the beaker, the display was rated by visual inspection as PASS or FAIL based on the following criteria:

FAIL: The sealing layer of the display is pealed from the adjacent layers, the sealing layer includes cracks, or the color of the display is visually changed from the same display before submerging in water.

PASS: The sealing layer of the display does not have pealed portions from the adjacent layers, the sealing layer does not include cracks, and the color of the display is not visually changed from the same display before submerging in water F. Evaluation Method of Electro-Optic Performance The electro-optic performance of the display prepared by method B above was switched to the white state and the color of the white state was measured using a color computer (Spectrophotometer i1, supplied by x-rite). The display was switched to its red state and the color of red state was measured using a color computer (Spectrophotometer i1, supplied by x-rite). The results are reported for each color state (white and red) using CIELab color space values (L*, a*, and b*).

G. Evaluation of Peak Melting Temperature and Index of Crystallinity of Polyurethanes by Differential Scanning Calorimetry A known mass of a polyurethane was placed in a DSC pan and the pan was sealed with a DSC lid. The sample was heated from 30° C. to 220° C. at a rate of 10° C. using a Differential Scanning Calorimeter TA DSC25, supplied by TA Instruments. A graph of normalized Heat Flow (in W/g) versus Temperature was generated. The lowest point P of the line of the graph is the Peak Melting Temperature. The area of the graph (A) between the baseline and the normalized Heat Flow line was determined. Area A corresponds to the enthalpy of melting. A straight line was drawn from point P of the graph corresponding to the Peak Melting Temperature to point B of the baseline at the Onset Temperature. This straight line (P-B) separates the area A into areas A1 and A2. Area A1 corresponds to the area below the Peak Melting Temperature and area A2 corresponds to the area above the Peak Melting Temperature. Index of Crystallinity is the ratio of A1/A times 100. That is, $Ic=100*(A1/A)$.

Evaluation Results

Unless otherwise stated, the amounts of the ingredients in the disclosed compositions are in dry basis (not including solvents). The term Q.S. (quantum satis) is used in some compositions to represent the content of the carrier. It means that the content of this ingredient in the composition is as much as is needed to achieve the total 100 percent of the composition, and not more.

A number of aqueous sealing compositions were prepared by the general method described in A above. The prepared composition are provided in Table 1.

TABLE 1

Aqueous Sealing Compositions. Contents are weight percent of ingredient by weight of the total composition (including the water carrier).

| Ingredient | Comparative Ex. 1 | Comparative Ex. 2 | Ex. 3 | Ex. 4 | Ex. 5 |
|---|---|---|---|---|---|
| Poly(vinyl alcohol) containing an acetoacetate functional group; [1] | | | 53.2 | 59.0 | 53.2 |
| Poly(vinyl alcohol) not containing an acetoacetate functional group; [2] | 53.2 | 53.2 | | | |
| Polyurethane aqueous dispersion comprising high crystallinity polyurethane; [3] | 14.7 | | 14.7 | 16.3 | |
| Polyurethane aqueous dispersion comprising low crystallinity polyurethane; [4] | | 14.7 | | | 14.7 |
| Multifunctional polycarbodiimide crosslinker for crosslinking polyurethane; [5] | 2.67 | 2.67 | 2.67 | 2.96 | 2.96 |
| Surfactant acetylenic diol; [6] | 0.07 | 0.07 | 0.07 | 0.08 | 0.07 |
| Hydrophobically modified alkali swellable acrylic emulsion; [7] | 0.28 | 0.28 | 0.28 | 0.31 | |
| Ammonium Hydroxide to adjust pH to 6.5-8.5 | | | | | |
| Deionized Water | Q.S. | Q.S. | Q.S. | Q.S. | Q.S |

Table 2 summarizes sealing layer compositions, the sealing layers being formed using the compositions of Table 1. That is, sealing layer composition Comparative Ex. 1S is formed by aqueous sealing composition from Comparative Ex. 1, sealing layer composition Comparative Ex. 2S is formed by aqueous sealing composition from Comparative Ex. 2, sealing layer composition Ex. 3S is formed by aqueous sealing composition from Ex. 3 (inventive), and sealing layer composition Ex. 4S is formed by aqueous sealing composition from Ex. 4 (inventive). Contents are weight percent of ingredient by weight of the composition excluding the water carrier (and other residual solvents). That is, sealing layer composition Comparative Ex. 1S is formed by aqueous sealing composition from Comparative Ex. 1, sealing layer composition Comparative Ex. 2S is formed by aqueous sealing composition from Comparative Ex. 2, sealing layer composition Ex. 3S is formed by aqueous sealing composition from Ex. 3 (inventive), sealing layer composition Ex. 4S is formed by aqueous sealing composition from Ex. 4 (inventive), and sealing layer composition Ex. 5S is formed by aqueous sealing composition from Ex. 5 (inventive). The physical properties of the polyurethane of the examples were determined by the method described in Method G above.

TABLE 2

Sealing Compositions. Contents are weight percent of ingredient by weight of the total composition.

| Ingredient | Comparative Ex. 1S | Comparative Ex. 2S | Ex. 3S | Ex. 4S | Ex. 5S |
|---|---|---|---|---|---|
| Poly(vinyl alcohol) containing an acetoacetate functional group; [1] | | | 75 | 75 | 75 |
| Poly(vinyl alcohol) not containing an acetoacetate functional group; [2] | 75 | 75 | | | |
| Crosslinked Polyurethane; formed from [3] and [5] | 24.5 | | 24.5 | 24.5 | |
| Crosslinked Polyurethane; formed from [4] and [5] | | 24.5 | | | 24.5 |
| Surfactant acetylenic diol; [6] | 0.1 | 0.1 | 0.1 | 0.1 | 0.1 |
| Hydrophobically modified alkali swellable acrylic emulsion; [7] | 0.40 | 0.40 | 0.40 | 0.40 | 0.40 |
| Peak Melting Temperature (Tm) of Polyurethane in degrees C. | 118.1 | 114.6 | 118.4 | 118.4 | 114.6 |
| Onset Temperature of polyurethane in degrees C. | 90.5 | 98.2 | 90.5 | 90.5 | 98.2 |
| Index of Crystallinity of polyurethane (Ic) | 18% | 3% | 18% | 18% | 3% |

Information for the materials of the compositions provided in Tables 1 and 2: [1] GOHSENX™ Z-410 supplied by Mitsubishi Chemical; degree of hydrolysis 98 percent; [2] Poly(vinyl alcohol-co-ethylene) copolymer; Exceval™ RS-1717, supplied by Kuraray; degree of hydrolysis 93 percent; ethylene content 8 percent; [3] Polyurethane aqueous dispersion; HD2125 aqueous dispersion, supplied by Hauthaway as a 35% dispersion in water; [4] Polyurethane aqueous dispersion (polyester); Witcobond® 386-03, supplied by Chemtura Corp.; [5] Picassian® XL-701, supplied by Stahl; [6] DYNOL™ 604 supplied by Evonik; [7] Solthix™ A-100 supplied by Lubrizol.

Table 3 provides the results of evaluation of electro-optic devices that comprise sealing layers the compositions of which are provided in Table 2. The electro-optic displays are prepared according to method D above.

TABLE 3

Results of evaluation of barrier property and water resistance of electro-optic displays that comprise sealing layer compositions from Table 2.

| Evaluation | Comparative Ex. 1S | Comparative Ex. 2S | Ex. 3S | Ex. 4S | Ex. 5S |
|---|---|---|---|---|---|
| Barrier property to non-polar fluid (Method C) | PASS | FAIL | PASS | PASS | PASS |
| Water resistance (Method E1) | FAIL | FAIL | PASS | PASS | PASS |
| Water resistance (Method E2) | FAIL | FAIL | PASS | PASS | FAIL |

The evaluation results provide in Table 3 demonstrate that sealing layers comprising a combination of poly(vinyl alcohol) and polyurethane, wherein the poly(vinyl alcohol) contains an acetoacetate functional group, such as GOHSENX™ Z-410 (Ex. S3, S4, and S5), show better barrier properties to non-polar fluids and better water resistance at 25° C. than sealing layers comprising poly(vinyl alcohol) without an acetoacetate functional group, such as Exceval™ RS-1717 (Comparative Ex. S1-S2).

Sealing layers comprising a combination of poly(vinyl alcohol) and polyurethane, wherein the poly(vinyl alcohol) contains an acetoacetate functional group, such as GOHSENX™ Z-410, and wherein the polyurethane has Peak Melting Temperature of 115° C. and higher and Index of Crystallinity of 8% and higher, such as HD2125, show better water resistance at 100° C. than sealing layers that contain a combination of poly(vinyl alcohol) and polyurethane, wherein the poly(vinyl alcohol) contains an acetoacetate functional group, such as GOHSENX™ Z-410, and polyurethane having Peak Melting Temperature lower than 115° C. and index of Crystallinity lower than 8%, such as Witcobond® 386-03 (Ex. S2 and S3 versus Ex. S5).

Table 4 summarizes the results of evaluation of the electro-optic performance of electro-optic display that comprises sealing layer that corresponds to Comparative Example 2S and Example 3S (inventive). The data represent color data of the white state and the red state of the corresponding electro-optic display determined by the method F above.

TABLE 4

Electro-optic performance of electro-optic displays.

| CIELab Color | | Comparative Ex. 2S | Ex. 3S |
|---|---|---|---|
| White State | L* | 65.8 | 64.3 |
| | a* | 11.0 | 11.1 |
| | b* | 2.20 | 1.50 |
| Red State | L* | 42.3 | 40.4 |
| | a* | 49.1 | 50.5 |
| | b* | 22.3 | 23.2 |

The data of Table 4 shows that the color states of electro-optic displays comprising sealing layers having compositions from Comparable Ex. 2S and Ex. 3S (inventive) are very similar. That is, the use of inventive sealing layer composition does not negatively affect the color states of the display.

What is claimed is:

1. A water-resistant sealing layer comprising:
   a. from 40 to 95 weight percent of a poly(vinyl alcohol) by weight of the sealing layer excluding solvents, the poly(vinyl alcohol) containing an acetoacetate functional group in its molecular structure, the poly(vinyl alcohol) having a degree of hydrolysis of from 90 to 99 percent; and
   b. from 5 to 60 weight percent of a polyurethane by weight of the sealing layer excluding solvents.

2. The water-resistant sealing layer of claim 1, wherein the polyurethane has Peak Melting Temperature of 115° C. and higher and Index of Crystallinity of 8% and higher.

3. The water-resistant sealing layer of claim 1, wherein the polyurethane is crosslinked.

4. The water-resistant sealing layer of claim 3, wherein the polyurethane is crosslinked by a crosslinker, the crosslinker being a polyisocyanate, a multifunctional polycarbodiimide, a multifunctional aziridine, a silane coupling agent, a boron/titanium/zirconium-based crosslinker, or a melamine formaldehyde.

5. The water-resistant sealing layer of claim 1, wherein the poly(vinyl alcohol) is crosslinked.

6. The water-resistant sealing layer of claim 5, wherein the crosslinked poly(vinyl alcohol) is formed by the reaction of poly(vinyl alcohol) and a crosslinker, the crosslinker being selected from the group consisting of dialdehyde, and organic zirconate.

7. The water-resistant sealing layer of claim 6, wherein the crosslinker is selected from the group consisting of glyoxal, $ZrO(OH)Cl*nH_2O$, and $(NH4)_2ZrO(CO_3)_2$.

8. The water-resistant sealing layer of claim 1, the sealing layer further comprising a surfactant, the surfactant being selected from the group consisting of acetylenic diol, organosilicone, and combination thereof.

9. The water-resistant sealing layer of claim 1, wherein the sealing layer is formed from an aqueous sealing composition.

10. The water-resistant sealing layer of claim 9, wherein the aqueous sealing composition has a pot life longer than 1 day.

11. The water-resistant sealing layer of claim 9, wherein the aqueous sealing composition comprises a polyurethane dispersion.

12. The water-resistant sealing layer of claim 9, wherein the polyurethane has number average molecular weight from 1,000 to 2,000,000 Daltons.

13. The water-resistant sealing layer of claim 9, wherein the poly(vinyl alcohol) has number average molecular weight from 1,000 to 1,000,000 Daltons.

14. An electrophoretic display comprising in order:
   a first light-transmissive electrode layer;
   an electro-optic material layer comprising a sealing layer according to claim 1 and a microcell layer comprising a plurality of microcells, each of the plurality of microcells including a bottom, walls, and an opening, and containing an electrophoretic medium, said electrophoretic medium comprising at least one type of charged pigment particles dispersed in a non-polar fluid, wherein the sealing layer spans the openings of the plurality of microcells;
   a second electrode layer.

15. The electrophoretic display of claim 14, wherein the polyurethane has Peak Melting Temperature of 115° C. and higher and Index of Crystallinity of 8% and higher.

16. The electrophoretic display of claim 14, wherein the sealing layer is disposed between the microcell layer and the second electrode layer.

17. The electrophoretic display of claim 14, wherein the electrophoretic medium comprises four types of charged pigment particles, wherein the color of the four or more pigment particles are selected from the group consisting of white, magenta, yellow, cyan, blue, red, green, and black.

18. The electrophoretic display of claim 14, further comprising a piezoelectric material layer comprising a piezoelectric material, wherein the piezoelectric material layer is disposed between the first light-transmissive electrode layer material and the electro-optic material layer or between the electro-optic material layer and the second electrode layer.

19. The electrophoretic display of claim 14, wherein the electrophoretic display is used as an authentication element on an object, the object being selected from the group consisting of currency, stock certificates, bond certificates, negotiable instruments, debit cards, credit cards, documents, and smart cards.

20. A water-resistant sealing layer comprising:
   a. from 40 to 95 weight percent of a poly(vinyl alcohol) by weight of the sealing layer excluding solvents, the poly(vinyl alcohol) containing an acetoacetate functional group in its molecular structure; and b. from 5 to 60 weight percent of a polyurethane by weight of the sealing layer excluding solvents;

wherein the sealing layer is formed from an aqueous sealing composition, and wherein the aqueous sealing composition has a pot life longer than 1 day.

21. A water-resistant sealing layer comprising:
a. from 40 to 95 weight percent of a poly(vinyl alcohol) by weight of the sealing layer excluding solvents, the poly(vinyl alcohol) containing an acetoacetate functional group in its molecular structure; and
b. from 5 to 60 weight percent of a polyurethane by weight of the sealing layer excluding solvents, wherein the polyurethane has Peak Melting Temperature of 115° C. and higher and Index of Crystallinity of 8% and higher.

* * * * *